United States Patent
Kim et al.

(10) Patent No.: US 11,068,940 B2
(45) Date of Patent: Jul. 20, 2021

(54) SYSTEM AND METHOD FOR PROVIDING MOBILE ADVERTISING SERVICES

(71) Applicant: Samsung Electronics Co., Ltd., Suwon-si (KR)

(72) Inventors: Changwon Kim, Asan-si (KR); Jaehwan Kim, Suwon-si (KR); Youngho Rhee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 15/698,145

(22) Filed: Sep. 7, 2017

(65) Prior Publication Data

US 2017/0372369 A1    Dec. 28, 2017

Related U.S. Application Data

(62) Division of application No. 13/688,737, filed on Nov. 29, 2012, now abandoned.

(60) Provisional application No. 61/565,726, filed on Dec. 1, 2011.

(30) Foreign Application Priority Data

Sep. 10, 2012  (KR) .................. 10-2012-0099997

(51) Int. Cl.
    *G06Q 30/02*    (2012.01)

(52) U.S. Cl.
    CPC ..... *G06Q 30/0267* (2013.01); *G06Q 30/0207* (2013.01)

(58) Field of Classification Search
    CPC .................. G06Q 30/0267; G06Q 30/0207

USPC ........................................................ 705/7.19
See application file for complete search history.

(56) References Cited

U.S. PATENT DOCUMENTS

| | | |
|---|---|---|
| RE41,411 E | 6/2010 | Cobb |
| 2005/0216337 A1 | 9/2005 | Roberts et al. |
| 2008/0201664 A1 | 8/2008 | O |
| 2010/0125495 A1* | 5/2010 | Smith ............... G06Q 20/3223 705/14.23 |
| 2010/0312630 A1 | 12/2010 | Krutchik et al. |

(Continued)

FOREIGN PATENT DOCUMENTS

| | | |
|---|---|---|
| KR | 10-2007-0023414 A | 2/2007 |
| KR | 10-2008-0077772 A | 8/2008 |

(Continued)

OTHER PUBLICATIONS

Gibson, Corporate policies and general awareness are all over the map: unexplored territory: cell phone location tracking 31 Voice Report 1 (2010) (Year: 2010).*

(Continued)

*Primary Examiner* — Charles Guiliano
(74) *Attorney, Agent, or Firm* — Jefferson IP Law, LLP

(57) ABSTRACT

A system and method that can customize mobile advertising services and increase the effectiveness of advertising is provided. The method includes registering contact details of one or more advertisers in a phone book, receiving one or more mobile advertising messages from the registered advertisers, notifying a user of the reception of the mobile advertising messages, and displaying the received mobile advertising messages according to the user's confirmation request.

8 Claims, 33 Drawing Sheets

(56) References Cited

U.S. PATENT DOCUMENTS

| | | | |
|---|---|---|---|
| 2011/0029359 A1* | 2/2011 | Roeding | G06Q 30/00 |
| | | | 705/14.1 |
| 2011/0208589 A1 | 8/2011 | Garg | |
| 2011/0212711 A1 | 9/2011 | Scott | |
| 2012/0054010 A1* | 3/2012 | Bouta | G06Q 30/02 |
| | | | 705/14.16 |
| 2012/0204191 A1 | 8/2012 | Shia et al. | |
| 2013/0145295 A1 | 6/2013 | Bocking et al. | |

FOREIGN PATENT DOCUMENTS

| KR | 10-2009-0000212 A | 1/2009 |
|---|---|---|
| KR | 10-2009-0080000 A | 7/2009 |

OTHER PUBLICATIONS stampt.com; "Stampt is a revolutionary customer loyalty program for local merchants"; Dec. 20, 2014; 181 Fremont St., San Francisco, CA, 94105; http://stampt.com/how-it-works/.
Korean Office Action dated Apr. 30, 2019, issued in Korean Patent Application No. 10-2012-0099997.
Korean Office Action dated Aug. 9, 2018, issued in Korean Patent Application No. 10-2012-0099997.

* cited by examiner

FIG. 27

ADbee                  Home    Profile    Log out

MCDONALDS YEOKSAM OUTLET
Seoul Gangnam-gu Yeoksam dong 737

Choose Contents | MCDONALDS - 50% DISCOUNT ON BIG MAC SET | ▶ — 2701

Overview

| | |
|---|---|
| Coupon Title | MCDONALDS - 50% DISCOUNT ON BIG MAC SET |
| Type | Discount Prices (₩2,500) |
| How to use | COUPON MUST BE PRESENTED AT TIME OF PAYMENT TO RECEIVE DISCOUNT(MULTIPLE DISCOUNTS ARE NOT ACCEPTABLE) |
| Valid date | 9/30/2011 ~ 6/10/2011 |
| Receive group | To All |
| Number of coupons | 100 |

— 2702

September 25 at 9:04pm

Insights

800 Downloaded     100 Used

See more... — 2703

Downloaded ratio 800 / 1000    80%
Used ratio 100 / 800    12.5%
Left time 397 hours    6 day 13 hours left 800 Interaction
30% / 70%
☐ Phone book
☐ Application
☐ QR code 532 Male    168 Female Female 22%
0.71%   2.1%   13%   5%   0.47%   0.24%
13-17   18-24   25-34   35-44   45-54   55-

Male 76%
0.94%   3.3%   30%   35%   6.4%   0.24%

--- i'm lovin' it®

☐ Feed
☐ Stats

Check In
Total    2100 ◄
This Week    300 ►
New User    86 ◄
           See More Create your own stuff
Decal    Stamp

ADbee  Home  Profile  Log out

COFFEE BEAN GANGNAM OUTLET
Gourmet & Cafe / Coffee Shops   Seoul Gangnam-gu Yeoksam dong 820-10
Choose Contents [Stamp] COFFEE BEAN GANGNAM OUTLET; COUPON FOR ONE FREE BEVERAGE
Check In

| Total | This week | New User |
|---|---|---|
| 3691 ↑1% | 209 ↓16% | 105 ↑4% |

■ This week
■ New User

Sun(18) Mon(19) Tue(20) Wed(21) The(22) Fri(23) Sat(24)

Rank  13 th ↓1
Location
Seoul Gangnam-gu
1. MCDONALDS YEOKSAM OUTLET
2. STARBUCKS GANGNAM OUTLET
3. BURGER KING GANGNAM OUTLET
4. MAD FOR GARLIC SAMSUNG TOWN OUTLET
5. KFC GANGNAM OUTLET
6. OMUTO TOMATO YEOKSAM OUTLET
7. –
8. –
9. –
10. ...

Category  2 th –
Gourmet & Cafe | Coffee Shops
1. STARBUCKS GANGNAM OUTLET
2. COFFEE BEAN GANGNAM OUTLET
3. PASCUCCI GANGNAM OUTLET
4. CAF□ BENE GANGNAM OUTLET
5. ZOO COFFEE GANGNAM OUTLET
6. ANGELINUS GANGNAM OUTLET
7. –
8. –
9. –
10. ...

The Coffee Bean & Tea Leaf Est. 1963

☐ Feed
☐ Stats

Check In
Total       3691  ◄
This Week   209  ►
New User    105  ◄
[See More]

Create your own stuff
Decal   Stamp

FIG. 30

ADbee | Home | Profile | Log out

2010b

Edit — 3010

MCDONALDS YEOKSAM OUTLET
Gourmet & Cafe · Fast Food · Seoul Gangnam-gu Yeoksam dong 737

| | |
|---|---|
| Company Name | MCDONALDS STARTOWER OUTLET \| Company Registration No. 123-45-67890 |
| E-mail | startower@mcdonalds.co.kr |
| Tel. | 02-2112-2925 |
| Category | Gourmet & Cafe |
| Detail | Fast Food |
| Address | 135-080, Seoul Gangnam-gu Yeoksam dong 737 |

Lunch Time (11:00am ~ 13:00pm)

SHANGHAI SPICY CHICKEN BURGER SET ₩4,000

BIG MAC SET ₩3,500

CHEESE BURGER SET ₩3,500

Store Pictures i'm lovin' it

☐ Feed
☐ Stats

Check In
Total       2100 ◄ ►
This Week    300 ◄ ►
New User      86 ◄ ►
                See More Create your own stuff Decal    Stamp

SYSTEM AND METHOD FOR PROVIDING MOBILE ADVERTISING SERVICES

CROSS-REFERENCE TO RELATED APPLICATION(S)

This application is a divisional application of prior application Ser. No. 13/688,737, filed on Nov. 29, 2012, and claimed the benefit under 35 U.S.C. § 119(e) of a U.S. Provisional application filed on Dec. 1, 2011 in the U.S. Patent and Trademark Office and assigned Ser. No. 61/565,726, and under 35 U.S.C. § 119(a) of a Korean patent application filed on Sep. 10, 2012 in the Korean Intellectual Property Office and assigned Serial No. 10-2012-0099997, the entire disclosure of which is hereby incorporated by reference.

BACKGROUND OF THE INVENTION

1. Field of the Invention

The present invention relates to mobile advertising. More particularly, the present invention relates to a system and method that can provide customized mobile advertising services, thereby increasing the effectiveness of advertising.

2. Description of the Related Art

With the rapid development of information and communication technology and semiconductor technology, the use of various types of mobile devices has also increased. Mobile devices provide additional services provided by other types of mobile systems in addition to their traditional services. For example, mobile devices include their usual communication functions such as voice calling or message transmission, as well as additional functions, such as a TeleVision (TV) viewing function (e.g., mobile broadcasting, such as Digital Multimedia Broadcasting (DMB), Digital Video Broadcasting (DVB), etc.), an audio playback function (e.g., Moving Picture Experts Group (MPEG) Audio Layer 3 (MP3)), a camera function, a data communication function, an Internet function, a short-range Radio Frequency (RF) communication function, and the like.

As most people are using mobile devices that provide a variety of mobile communication services, advertising via the mobile devices, i.e., mobile advertising, and the mobile advertising service have attracted attention in the various fields. However, mobile advertising services according to the related art are implemented in such a way that advertising messages are broadcast to an unspecified number of mobile devices, using one method, irrespective of the users' interest. This may inconvenience mobile device users since the adverting messages are perceived as spam messages. As a result, mobile device users register the phone numbers transmitted in the advertising messages in the list of spam numbers or remove the received messages from the mail boxes of the mobile devices without reading them. Accordingly, such mobile advertising methods cannot efficiently provide coverage of corresponding advertisements or provide advertising information.

SUMMARY OF THE INVENTION

Aspects of the present invention are to address at least the above-mentioned problems and/or disadvantages and to provide at least the advantages described below. Accordingly, an aspect of the present invention is to provide a system and method that can provide customized mobile advertising services and thus increase the effectiveness of advertising.

Another aspect of the present invention is to provide a system and method that can receive mobile advertising messages from specific advertisers based on a phone book.

Another aspect of the present invention is to provide a system and method that can display one or more from among the received mobile advertising messages, in order of those that have been downloaded.

Another aspect of the present invention is to provide a system and method that can create a database by automatically processing information regarding customers who have registered a phone number of an advertiser in their phone books, can manage the database, and can efficiently issue mobile advertising messages via the database.

In accordance with an aspect of the present invention, a method for providing a mobile advertising service is provided. The method includes registering contact details of one or more advertisers in a phone book, receiving one or more mobile advertising messages from the registered advertisers, notifying a user of the reception of the mobile advertising messages, and displaying the received mobile advertising messages according to the user's confirmation request.

In accordance with another aspect of the present invention, a method for providing a mobile advertising service is provided. The method includes detecting the execution of a mobile advertising application, receiving one or more mobile advertising messages according to the execution of the mobile advertising application, and arranging and displaying the received mobile advertising messages according to a preset rule. The arrangement and display of the received mobile advertising messages includes arranging and displaying, in order, mobile advertising messages that have a history where at least one of the coupon, invitation, and stamp card was downloaded, mobile advertising messages issued by advertisers who have been registered in a phone book, and remaining mobile advertising messages.

In accordance with another aspect of the present invention, a method for providing a mobile advertising service is provided. The method includes receiving contact details of an advertiser who signed up for the mobile advertising service, receiving a phone book of a subscriber who signed up for the mobile advertising service, searching the phone book of the subscriber for the contact details of the advertiser, and automatically registering information regarding subscribers who have registered the contact details of the advertiser in the phone book in a customer database of the advertiser.

In accordance with another aspect of the present invention, a method for providing a mobile advertising service is provided. The method includes requesting creation of a mobile advertising message, receiving information regarding the mobile advertising message and information regarding a class of a customer to which the mobile advertising message is to be transmitted, and transmitting the mobile advertising message to a mobile device of the customer corresponding to the received customer class.

In accordance with another aspect of the present invention, a method for providing a mobile advertising service is provided. The method includes receiving a request for the creation of a Quick Response (QR) code, receiving information for selecting a template to create the QR code and a message input to the selected template, and creating the QR code based on the selected template and the received message.

In accordance with another aspect of the present invention, a system for providing mobile advertising services is provided. The system includes a mobile advertising server, and one or more mobile devices. The mobile advertising server receives and stores phone books from the mobile devices, receives a request for the transmission of mobile advertising messages of an advertiser from the advertiser, searches for corresponding mobile devices that have stored contact details of the advertiser in the phone book, and transmits the mobile advertising messages to the searched mobile devices. The mobile device stores one or more contact details of an advertiser in the phone book, receives one or more mobile advertising messages issued from the advertiser registered in the phone book, notifies the user of the reception of mobile advertising messages, and displays the received mobile advertising messages according to the user's message confirmation request.

In accordance with another aspect of the present invention, a mobile device is provided. The device includes a memory unit for storing a phone book including contact details of one or more advertisers, a communication unit for transmitting the phone book to a mobile advertising server and for receiving one or more mobile advertising messages from advertisers registered in the phone book, a display unit for displaying a notification of the reception of the mobile advertising messages, and a controller for controlling the display unit to display the received mobile advertising messages according to a mobile advertising message confirming request.

In accordance with another aspect of the present invention, a mobile device is provided. The mobile device includes a memory unit for storing a mobile advertising application, a location information receiving unit for receiving information regarding the current location, a communication unit for receiving one or more mobile advertising messages from advertisers in a preset range of area from the current location, according to the execution of the mobile advertising application, a display unit for arranging and displaying the received mobile advertising messages according to a preset rule, and a controller for arranging and displaying, in order, mobile advertising messages that have a history where at least one of a coupon, an invitation, and a stamp card was downloaded, mobile advertising messages issued by advertisers who have been registered in the phone book, and remaining mobile advertising messages.

In accordance with another aspect of the present invention, a phone book server that manages information regarding an advertiser's customers is provided. The phone book server receives contact details of an advertiser who signed up for a mobile advertising service and a phone book of a subscriber who signed up for the mobile advertising service, searches the phone book of the subscriber for the contact details of the advertiser, and automatically registers information regarding subscribers who have registered the contact details of the advertiser in the phone book in a customer database of the advertiser.

In accordance with another aspect of the present invention, a mobile advertising web server that supports the creation of a mobile advertising message is provided. The mobile advertising web server receives a request for the creation of the mobile advertising message via a logged in computer, transmits, to the computer, web pages for creating mobile advertisements to which information to create the mobile advertising message and a class of customers to which the mobile advertising message is to be transmitted are entered, and transmits the created mobile advertising message to mobile devices of customers corresponding to the customer class, according to a mobile advertising message issuing request from the computer.

In accordance with another aspect of the present invention, a mobile advertising web server that supports the creation of a QR code is provided. The mobile advertising web server receives a request for the creation of the QR code via a logged in computer, transmits, to the computer, web pages for creating a QR code to which information to select a template for creating the QR code and a message input to the selected template are entered, and issues the QR code based on the selected template and the input message, according to a QR code creating command transmitted from the computer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 25 to 28 illustrate screens showing statistical information regarding use states of mobile advertising messages according to an exemplary embodiment of the present invention;

FIG. 29 illustrates a screen showing details of check-in information according to an exemplary embodiment of the present invention; and FIGS. 30 and 31 illustrate screens for managing profile information regarding an advertiser according to an exemplary embodiment of the present invention.

DETAILED DESCRIPTION OF EXEMPLARY EMBODIMENTS

Figure 1:
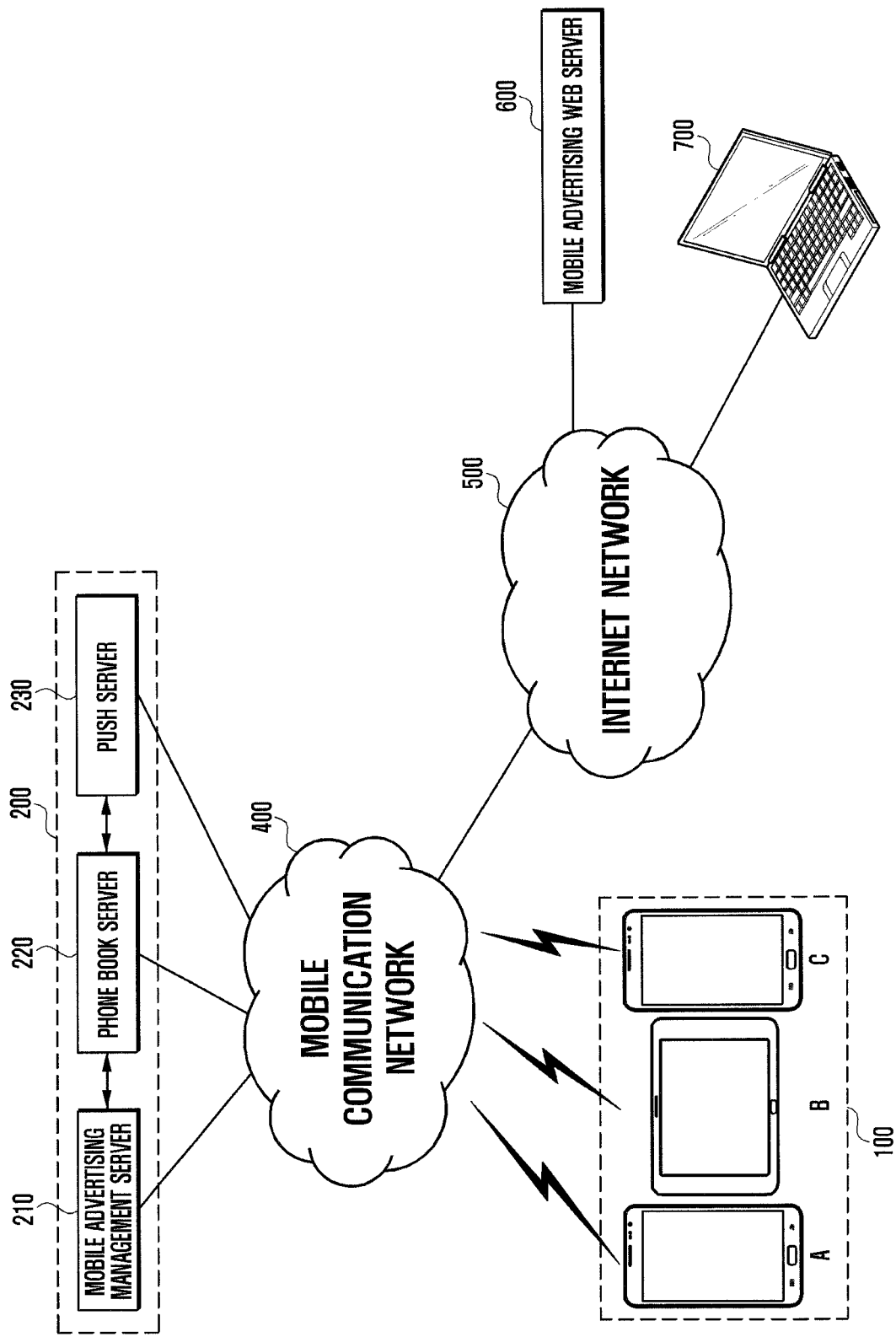
FIG. 1 illustrates a system for providing mobile advertising services according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood that the exemplary embodiments of the present invention disclosed in the description and configurations illustrated in the drawings are only preferred exemplary embodiments of the present invention, instead there may be various modifications, alterations, and equivalents thereof to replace the exemplary embodiments of the present invention at the time of filing this application.

FIG. 1 illustrates a configuration view showing a system for providing mobile advertising services according to an exemplary embodiment of the present invention.

Referring to FIG. 1, the system includes one or more mobile devices 100, a mobile advertising server 200, a mobile communication network 400, an Internet network 500, a mobile advertising web server 600 and a Personal Computer (PC) 700.

The mobile device 100 includes mobile communication terminals that receive mobile advertising messages via the mobile communication network 400, tablet personal computers, smart phones, and the like. Mobile advertising messages include coupons, invitations, news, stamp cards, and the like.

The mobile device 100 synchronizes a phone book with the mobile advertising server 200, periodically or each time that the phone book information is altered (e.g., deleted, added, or modified). For example, if the mobile device 100 registers one or more contact details (e.g., phone numbers) of an advertiser in the phone book, the mobile device 100 transmits the information to the mobile advertising server 200. The contact details of an advertiser may be manually registered in the phone book of the mobile device 100 via the phone book menu. The contact details of an advertiser may be registered in the phone book in such a way that the advertiser's log is selected from a call log or message transmission/reception log and the contact details of the advertiser are added to the phone book via the contact addition menu. The contact details of an advertiser may be registered in the phone book by operating a contact addition menu included in a mobile advertising message transmitted from the advertiser.

The mobile device 100 receives one or more mobile advertising messages issued from an advertiser registered in the phone book, and notifies the user of the message reception, based on the phone book. If the mobile device 100 receives a user's request for a mobile advertising message, the mobile device 100 displays the received mobile advertising message. The method for displaying received mobile advertising messages is described below with respect to FIGS. 3 to 6.

The mobile device 100 includes a mobile advertising application for receiving mobile advertising messages. When the mobile advertising application is executed, the mobile device 100 receives one or more mobile advertising messages, and arranges and displays the mobile advertising messages according to a preset rule. For example, the mobile device 100 may first display a mobile advertising message that includes coupons, invitations, stamp cards, and the like, at least one of which has been downloaded. If the mobile device 100 receives mobile advertising messages with the same priority (e.g., they have a download history), the mobile device 100 may display the mobile advertising messages in order of distance from the mobile device 100 to the advertisers who transmitted the messages. The method for receiving and displaying mobile advertising messages via the mobile advertising application is described below with respect to FIGS. 7 to 16.

If the mobile device 100 is designed to provide an Internet access function, the mobile device 100 may operate in the similar way to the PC 700 that will be described later.

The mobile advertising server 200 controls the mobile advertising services. The mobile advertising server 200 receives and stores phone books from one or more mobile devices. The mobile advertising server 200 receives phone books from individuals and periodically updates the phone books via a synchronization service. The mobile advertising server 200 receives mobile advertisements from advertisers, searches for phone books transmitted from the mobile devices, and transmits the mobile advertisements to corresponding mobile devices that have stored the contact details (e.g., phone numbers) of a corresponding advertiser in the phone book. The mobile advertising server 200 includes a mobile advertising management server 210, a phone book server 220 and a push server 230.

The mobile advertising management server 210 receives and manages mobile advertisements from advertisers, which may include storing the mobile advertisements for a period of time. The mobile advertising management server 210 transmits stored mobile advertisements to corresponding mobile devices (that have stored, in their phone books, the contact details of a corresponding advertiser that issued the mobile advertisements).

The phone book server 220 receives, stores, and manages phone books from mobile devices 100, via a synchronization service. The phone book server 220 manages information regarding customers of advertisers, respectively. The phone book server 220 collects information regarding mobile devices that have stored phone numbers of advertisers in their phone books, and automatically creates a customer information database for the advertisers. The method for creating a customer information database is described below with respect to FIG. 17.

The push server 230 supports a push service. The push server 230 transmits the received mobile advertising messages to corresponding mobile devices in a push advertising mode. The push server 230 also transmits, to corresponding mobile devices, only a notification message indicating the presence of mobile advertising messages that the mobile devices may receive.

Although the exemplary embodiment of the present invention is implemented in such a way that the mobile advertising management server 210, the phone book server 220 and the push server 230 are separately configured, these elements may be integrated as one server while performing their functions. Similarly, the mobile advertising management server 210 and/or the phone book server 220 may be included in the mobile advertising web server 600.

The mobile advertising web server 600 provides web services allowing advertisers (or businesspeople) to create or manage mobile advertising messages via the PC 700. Examples of the PC 700 includes laptop computers, desktop computers, netbook computers, and the like. The mobile advertising web server 600 may transmit various types of web pages related to mobile advertising services to the PC 700. The web pages will be described in detail later referring to FIGS. 20 to 31. According to another exemplary embodiment of the present invention, the mobile advertising web server 600 may include the mobile advertising management server 210 and a phone book server 220.

The PC 700 accesses the mobile advertising web server 600, and creates mobile advertising messages that include news, coupons, invitations, stamp cards, Quick Response (QR) codes, and the like. The PC 700 transmits the mobile advertising messages to the customers' mobile devices via the Internet network 500 and the mobile communication network 400. When a log-in procedure has been completed, the PC 700 displays the initial screen for providing a mobile advertising service on the display. During the display of the initial screen, if the PC 700 receives user's input signals for creating news, coupons, invitations, stamp cards, or QR codes, for viewing statistical information, for viewing profile information, and the like, the PC 700 transmits them to the mobile advertising web server 600. If the PC 700 receives the web pages according to the user's input signals from the mobile advertising web server 600, the PC 700 displays the web pages on the display, which is described below with respect to FIGS. 20 to 31.

Figure 2:
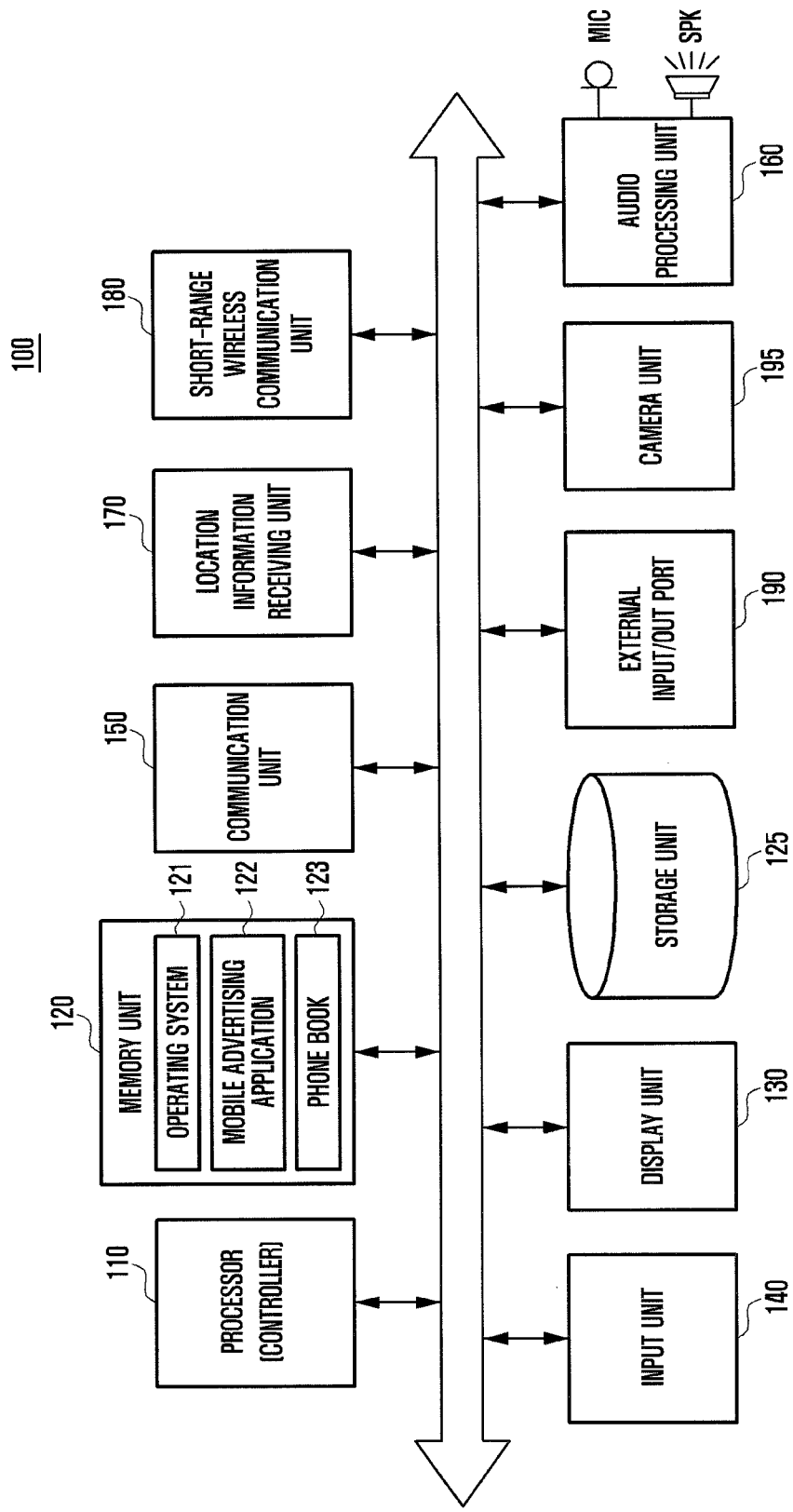
FIG. 2 illustrates a mobile device according to an exemplary embodiment of the present invention.

FIG. 2 illustrates a mobile device according to an exemplary embodiment of the present invention.

Referring to FIG. 2, the mobile device 100 includes a controller 110, a memory unit 120, a storage unit 125, a display unit 130, an input unit 140, a communication unit 150, an audio processing unit 160, a location information receiving unit 170, a short-range wireless communication unit 180, an external input/output port 190, and a camera unit 195. The memory unit 120 stores an operating system 121, a mobile advertising application 122 and a phone book 123.

The location information receiving unit 170 receives information regarding locations via a global satellite navigation system (e.g., a Global Positioning System (GPS), Global Navigation Satellite System (GNSS or GLONASS), etc.). The location information receiving unit 170 calculates a current location of a mobile device 100 by receiving and analyzing the signals from three or more satellites. The location information regarding the mobile device 100 is used to receive location-based mobile advertisements. For example, when the controller 110 executes the mobile advertising application 122, the location information receiving unit 170 is activated and calculates the location of the mobile device 100. After that, the location information receiving unit 170 transmits the information regarding the location of the mobile device 100 to the mobile advertising server 200 or the mobile advertising web server 600 via the communication unit 150.

The short-range wireless communication unit 180 supports short range wireless communication with other mobile devices. The short-range wireless communication unit 180 may support Near Field Communication (NFC), Radio Frequency Identification (RFID) communication, Bluetooth, and the like. Since NFC and RFID technologies are well known to people skilled in the art, the detailed descriptions will be omitted. The short-range wireless communication unit 180 may receive mobile advertising messages from short-range wireless communication devices installed near, for example, the entrances of buildings, such as a restaurant, a department store, a shopping mall, a market, and the like. The short-range wireless communication unit 180 of the mobile device 100 may receive mobile advertising messages from the short-range wireless communication device installed near an entrance of a building when the mobile device 100 enters the building or when the mobile device 100 contacts the short-range wireless communication device.

The external input/output port 190 serves as an interface connecting the mobile device 100 to an external system (e.g., a recharger, a headset system, a PC, etc.). The external input/output port 190 may be implemented with a Universal Serial Bus (USB) standard interface, a micro USB standard interface, a 4-pole earphone standard interface, and the like. It should be understood that the external input/output port 190 may also be implemented with specific standard interfaces according to mobile device manufacturers.

The camera unit 195 acquires images of a subject and converts the acquired images to electrical signals. The electrical signals of the images are stored, as digital data, in the storage unit 125. The camera unit 195 may be implemented with a Complementary Metal Oxide Semiconductor (CMOS) image sensor or a Charge Coupled Device (CCD) image sensor. The camera unit 195 supports functions for acquiring still images or videos. The camera unit 195 may take a photograph of a QR code according to the operation of a QR code scan menu and transfer the photograph to the controller 110.

The audio processing unit 160 includes audio parts that receive and transmit audio signals and encode and decode them. Examples of the audio parts includes codecs and audio amplifiers. The audio processing unit 160 is connected to a microphone MIC and a speaker SPK. The audio processing unit 160 converts analog audio signals, received via the microphone MIC, into digital audio signals, and then transfers them to the controller 110. The audio processing unit 160 also converts digital audio signals output from the controller 110 into analog audio signals, and outputs them via the speaker SPK. The audio processing unit 160 may also output various audio signals created in the mobile device 100 to the speaker, for example, audio signals created according to the playback of audio files or video files. In particular, the audio processing unit 160 may output a sound effect to notify a user of the reception of a mobile advertising message.

The communication unit 150 establishes communication channels for making a call or transmitting data. The communication unit 150 transmits the phone book 123, stored in the memory unit 120, to the mobile advertising server 200 under the control of the controller 110. In order to synchronize the phone book with the mobile advertising server 200, the communication unit 150 transmits the information to the server 200, periodically or each time that the phone book 123 is altered (e.g., deleted, added, or modified), under the control of the controller 110. The communication unit 150 may also receive mobile advertising messages, issued by advertisers that have been registered in the phone book 123 of the mobile device 100, from the mobile advertising server 200.

When the mobile advertising application 122 is executed, the communication unit 150 may transmit an access request signal to the mobile advertising web server 600 under the control of the controller 110. The access request signal includes an IDentifier (ID) and password. If the communication unit 150 is connected to the mobile advertising web server 600, the communication unit 150 may transmit the location information of the mobile device 100 thereto under the control of the controller 110. The communication unit 150 may receive mobile advertising messages, issued by advertisers within a certain range of area from the current location of the mobile device 100, from the mobile advertising web server 600. If a search mode for mobile advertising messages is altered in the mobile device 100, the mobile device 100 transmits the altered search mode to the mobile advertising web server 600 and receives mobile advertising messages according to the altered mode therefrom, via the communication unit 150.

The communication unit 150 may transmit a request signal for downloading coupons or stamps in a mobile advertising message to the mobile advertising server 200 or the mobile advertising web server 600. The communication unit 150 may also transmit a user's input comments, grading (such as by stars), and the like, to the mobile advertising server 200 or the mobile advertising web server 600. The communication unit 150 transmits signals for controlling the reception and display of mobile advertisements to the mobile advertising server 200 or the mobile advertising web server 600 and receives reply signals therefrom. The operations are described below with respect to FIGS. 4 to 6 and FIGS. 8 to 16.

The communication unit 150 establishes a communication channel with the mobile advertising web server 600 via the mobile communication network 400 and the Internet network 500, e.g., a short-range wireless communication network (not shown) such as Wi-Fi, or a wired Internet by a wired cable. In that case, the mobile device 100 is operated in a similar way to the PC 700.

The input unit 140 includes input keys and function keys that receive numerical or alphabetical information and set and control a variety of functions in the mobile device 100. For example, the input unit 140 may include a call key for requesting a voice call/a video call, a key for requesting the termination of a voice/video call, a volume key for controlling the output volume of audio signals, direction keys, and the like. The input unit 140 creates signals for controlling mobile advertising services and transfers the signals to the controller 110. The input unit 140 may be implemented with one of a touch pad, a touch screen, a key pad, a joystick, a wheel key, and the like, or a combination thereof.

The display unit 130 displays menus of the mobile device 100 and information input by the user or information provided to the user. The display unit 130 provides various types of screens according to the operations of the mobile device 100, such as an idle screen, a message writing screen, a call screen, and the like. The display unit 130 displays a screen for notifying a user of the reception of a mobile advertising message, a screen for showing a received mobile advertising message in a preset search mode, various screens according to the execution of the mobile advertising application, and the like. The operation of the display unit 130 will be explained later via the screens referring to the drawings. The display unit 130 may be implemented with a Liquid Crystal Display (LCD), an Organic Light Emitting Diode (OLED), an Active Matrix Organic Light Emitting Diodes (AMOLED), or the like. If the display unit 130 is implemented with a touch screen, the display unit 130 may also serve as the input unit 140.

The memory unit 120 stores programs required for controlling the operations and functions according to exemplary embodiments of the present invention, user data, and the like. The memory unit 120 also stores an Operating System (OS) for booting the mobile device 100 and for controlling the entire operation. The memory unit 120 stores application programs for controlling the options of the mobile device 100, such as a camera function, an audio playback function, an image/video playback function, a short-range wireless communication function, and the like. The memory unit 120 also stores user data created when the mobile device 100 is used, such as text messages, game files, music files, movie files, and the like.

The memory unit 120 stores a program for managing the phone book 123. The phone book management program transmits the phone book 123 to the mobile advertising phone book server 220 of the mobile advertising server 200, and synchronizes the phone book 123 with the server. The phone book management program associates mobile advertising messages with the phone book 123. For example, the phone book management program outputs a list of phone book items, representing whether each item includes mobile advertising messages. The representation may be achieved with an icon in a numerical form. If a specific item is selected from the list, the phone book management program outputs the details. The details of the selected item include an area for displaying phone book information and an area for displaying a mobile advertisement. The method for receiving and displaying mobile advertising messages based on a phone book is described below with respect to FIGS. 3 to 6.

The memory unit 120 stores a mobile advertising application 122. The application 122 receives mobile advertising messages, issued by advertisers within a certain distance of the current location of the mobile device 100, and displays the mobile advertising messages according to a variety of search modes. The method for receiving and displaying mobile advertising messages via the mobile advertising application 122 are described below with respect to FIGS. 7 to 16.

The storage unit 125 stores user data. The storage unit 125 is installed in the mobile device 100 separately from the memory unit 120. The storage unit 125 may be implemented with an internal memory allocated to a part of the memory unit 120. Alternatively, the storage unit 125 may be implemented with an external memory device, such as a Secure Digital (SD) card, a micro-SD card, a T-flash memory card, and the like.

The controller 110 controls the entire operation of the mobile device 100 and the signals flowing among the components therein. The signals flow among the components via bus lines. The controller 110 may be a Central Processing Unit (CPU), Application Processors (APs), and the like. The controller 110 controls the reception and display of mobile advertising messages based on the mobile advertising application 122 and the phone book 123. The operation of the controller 110 is described below with respect to FIGS. 3 to 16.

Although not shown in FIG. 2, the mobile device 100 may selectively further include units having add-on functions, such as a broadcast module for receiving and reproducing broadcasts; an audio source playback module, such as a Moving Picture Experts Group (MEPG) Audio Layer 3 (MP3) module; a proximity sensor for detecting the presence of nearby objects; and the like. With the spread of digital convergence, although mobile devices vary too greatly to list their modifications in this description, it will be easily appreciated by those skilled in the art that the other units equivalent to the above-listed units may be further included in the mobile device.

Figure 3:
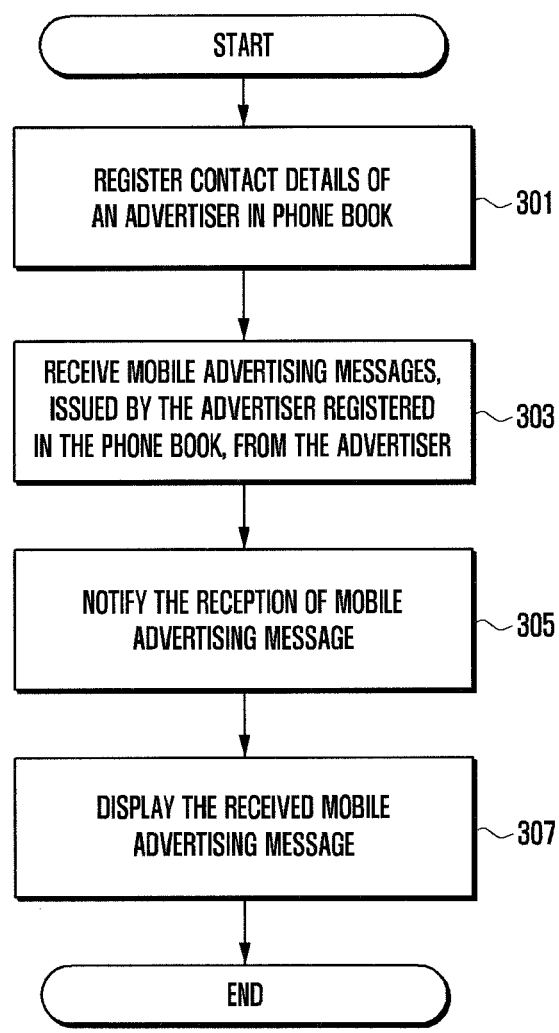
FIG. 3 illustrates a method for receiving a mobile advertising message, according to a first exemplary embodiment of the present invention.

FIG. 3 illustrates a method for receiving a mobile advertising message, according to a first exemplary embodiment of the present invention.

Referring to FIG. 3, the controller 110 of the mobile device 100 detects the registration of one or more contact details (e.g., phone numbers) of an advertiser in the phone book in step 301. The contact details of an advertiser may be manually registered in the phone book of the mobile device 100 via the phone book menu. The contact details of an advertiser may be registered in the phone book in such a way that the advertiser's log is selected from a call log or message transmission/reception log and then the contact details of the advertiser are added to the phone book via the contact addition menu. The contact details of an advertiser may be automatically registered in the phone book by operating a contact addition menu included in the mobile advertising message transmitted from the advertiser. These techniques are merely examples; any technique for registering the contact details in the phone book may be implemented.

The controller 110 receives mobile advertising messages, issued by the advertiser registered in the phone book, from the advertiser in step 303. The controller 110 transmits the contact details of the advertiser, registered in the phone book at step 301, to the mobile advertising server 200, and requests that the mobile advertising server 200 transmit mobile advertising messages issued by the advertiser registered in the phone book of the mobile device 100. The controller 110 receives mobile advertising messages broadcast from advertisers and parses the contact details of the advertisers from the received messages. If the controller 110 determines that the parsed contact details of the advertisers have been registered in the phone book, the controller 110 may receive the mobile advertising messages transmitted from the registered advertisers.

The controller 110 notifies the user of the reception of a mobile advertising message in step 305. For example, the controller 110 notifies the user of the reception of a mobile advertising message in such a way that the mobile device 110 displays a numerical icon, notifying the user of the number of unidentified mobile advertising messages, on the one side of the home screen or in the indicator area, or a phone book list including a notification bar showing the number of unidentified mobile advertising messages by operating the phone book menu; or a combination thereof. The controller 110 may also notify the user of the reception of a mobile advertising message by outputting a preset sound effect to the speaker of the audio processing unit 160, a preset pattern of vibration via a vibration generating unit (not shown), or a combination thereof.

The controller 110 displays the received mobile advertising messages according to the input of a signal for confirming mobile advertising message in step 307. For example, if a numerical icon displayed at one side of the home screen or in the indicator area is selected, the controller 110 arranges and displays one or more contact details including the mobile advertising messages according to a preset rule. If a notification bar is selected on the phone book screen, the controller 110 arranges and displays one or more contact details including the mobile advertising messages according to a preset rule.

If one of the contact details including a mobile advertising message is selected, the controller 110 controls the display unit 130 to display details of the selected contact on the details displaying screen. The details display screen includes a phone book area for showing contact details and a mobile advertising area for showing one or more mobile advertising messages transmitted from the advertiser. The detailed description is described below with respect to FIGS. 4 to 6. The first exemplary embodiment of the present invention may receive mobile advertising messages associated with the phone book, without using an additional application for managing the mobile advertising messages.

Figure 4:
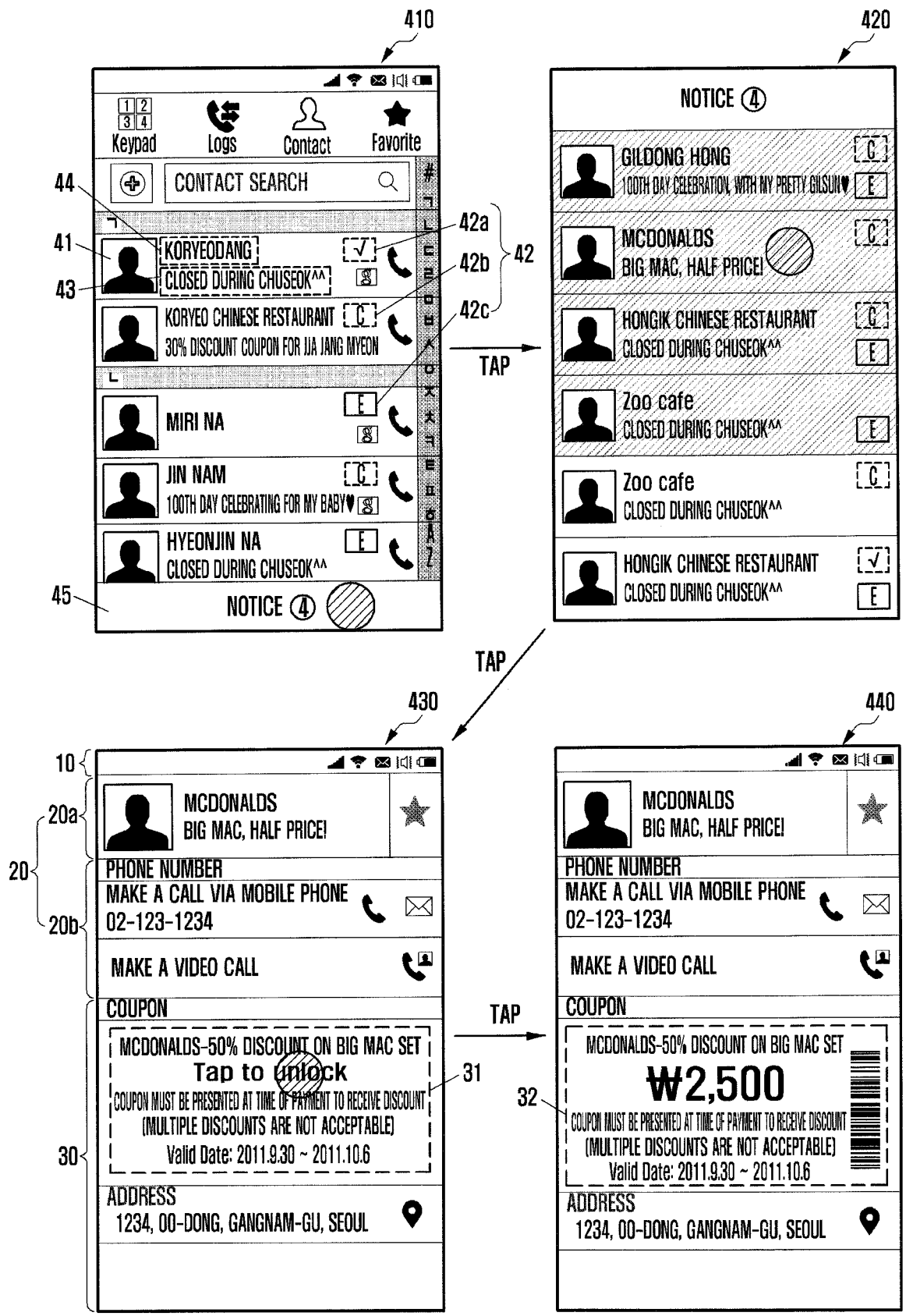
FIGS. 4 to 6 illustrate screens that describe methods for receiving mobile advertising messages, according to the first exemplary embodiment of the present invention.
Figure 5A:
Figure 5B:
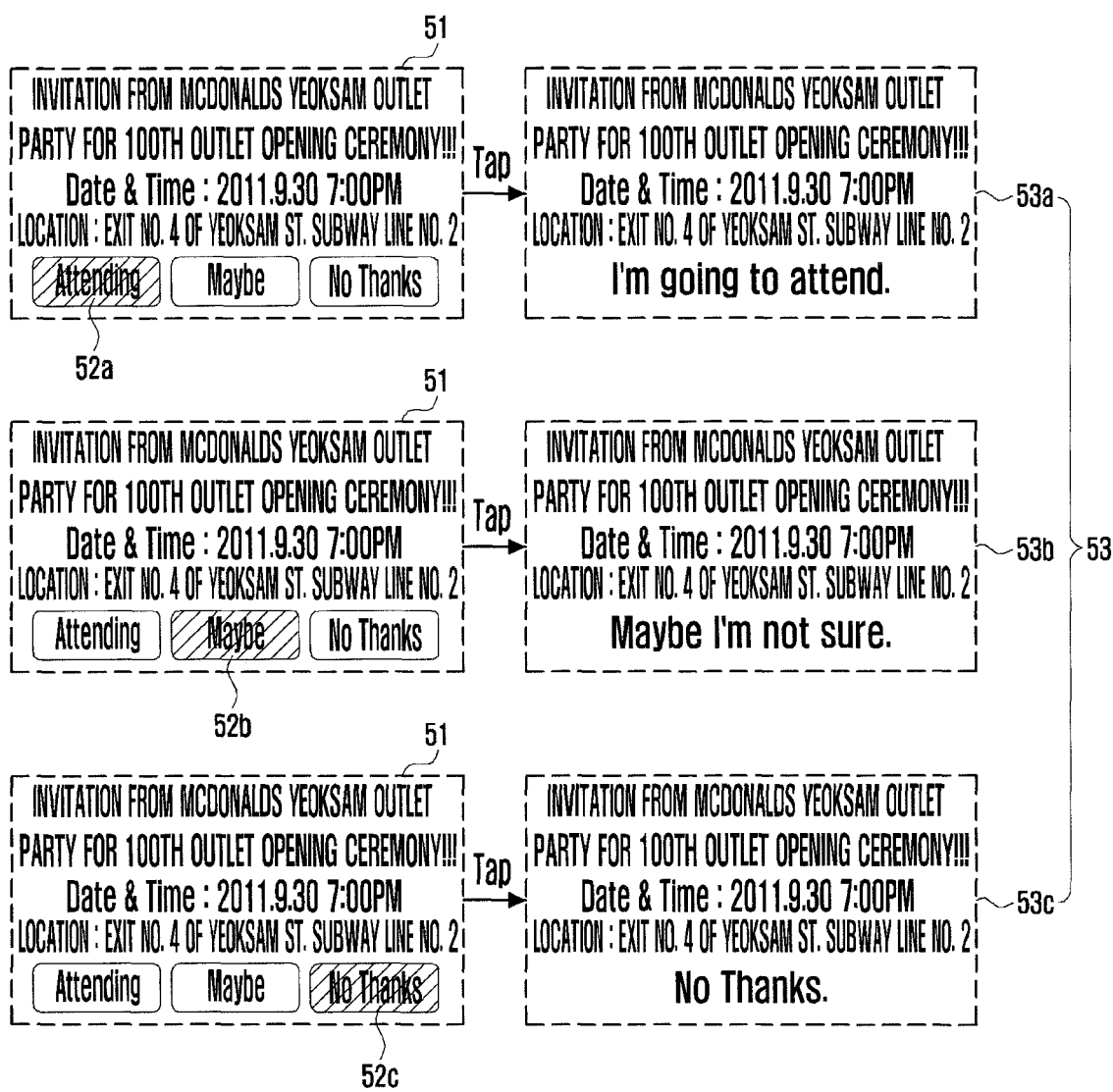
Figure 5C:
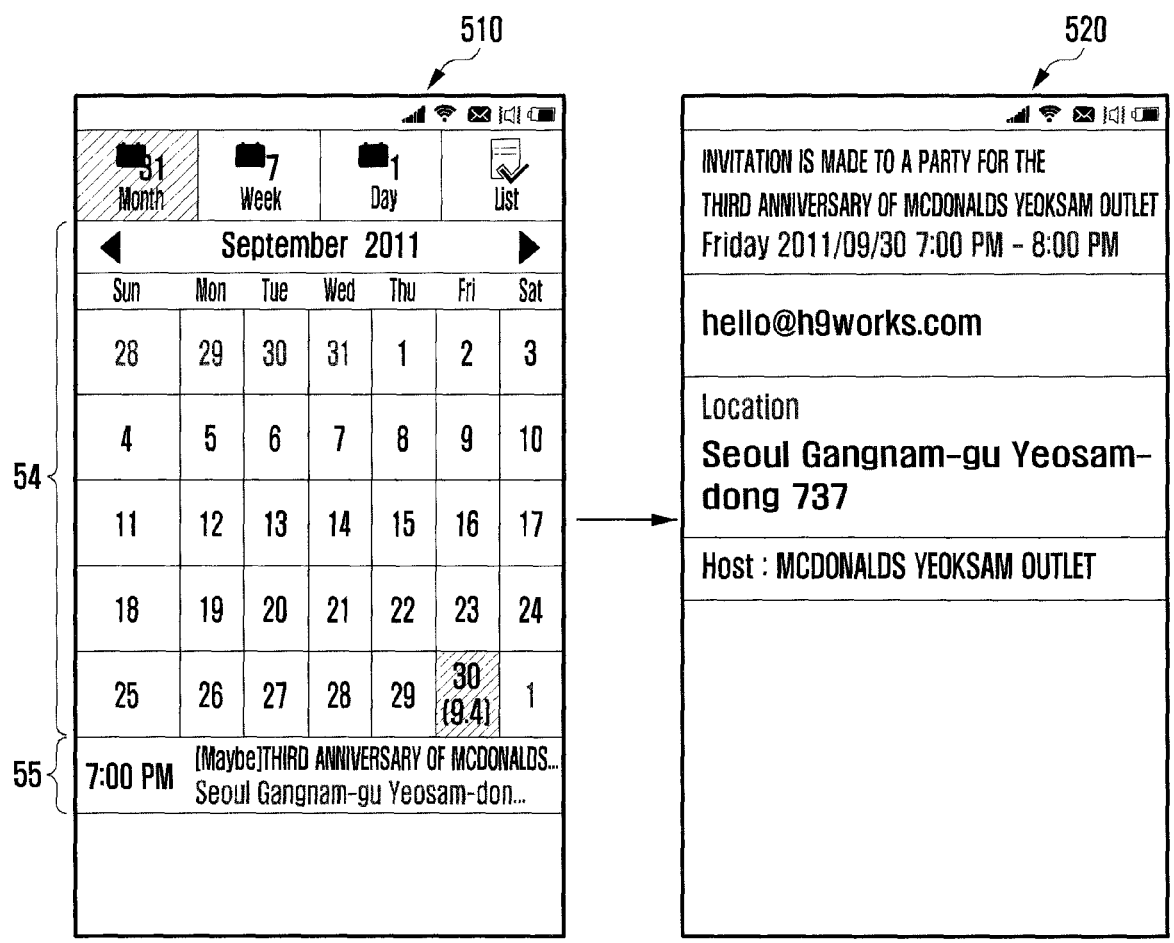
Figure 6:
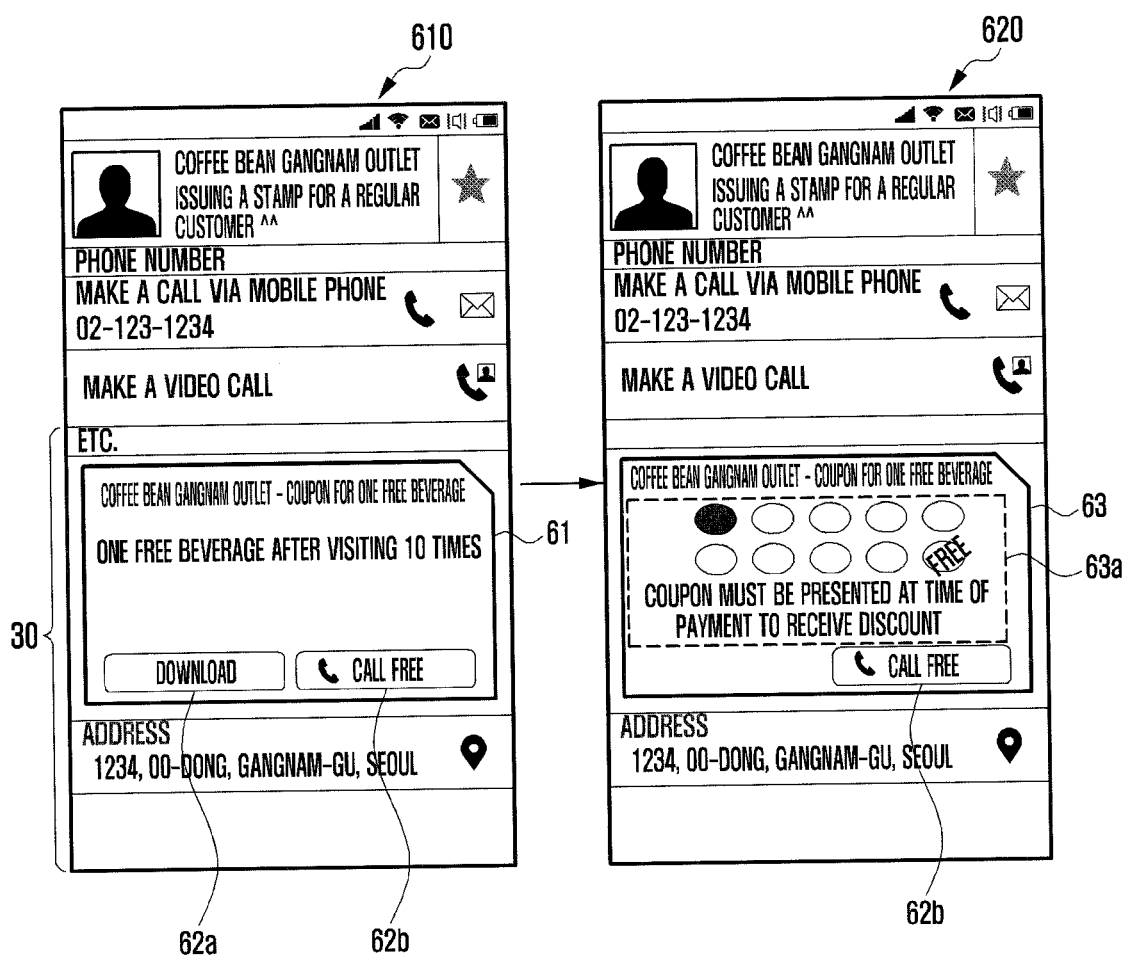

FIGS. 4 to 6 illustrate screens that describe methods for receiving mobile advertising messages, according to the first exemplary embodiment of the present invention.

FIG. 4 illustrates screens that describe the method for receiving a mobile advertising message with a coupon according to an exemplary embodiment of the present invention.

Referring to FIG. 4, the controller 110 controls the display unit 130 to display a phone book list according to a user's selection of a contact menu. As shown in diagram 410 of FIG. 4, the phone book list is displayed on the screen. A notification bar 45 for showing the number of unidentified mobile advertising messages is displayed at the bottom of the screen. If unidentified mobile advertising messages do not exist in the mobile device 100, the notification bar 45 is not displayed on the screen. Although the notification bar 45 in the first exemplary embodiment is located at the bottom of the screen and shaped as a bar as shown in diagram 410, it should be understood that exemplary embodiments of the present invention are not limited thereto.

Referring to diagram 410, the phone book list includes a number of items. An item including a mobile advertising message may include a representative image 41, an icon 42 for representing a type of mobile advertising message, a field 43 for showing news, and a field 44 for showing a name or title. The advertisement type icon 42 may include coupon icons 42a and 42b, and an invitation icon 42c. The coupon icon 42a refers to an icon of a coupon that has been downloaded. The coupon icon 42b refers to an icon of a coupon that has not been downloaded. Likewise, the invitation icon 42c refers to an icon of an invitation that has not been downloaded. Although not shown in FIG. 4, the advertisement type icon 42 may further include a stamp card icon. In that case, the backgrounds of the advertisement type icon 42 may be displayed in different colors according to types of advertisements, thereby providing visual distinction therebetween. As shown in diagram 420, each of the items in the phone book list may include a number of advertisement type icons. As shown in diagram 410, the news field 43 is located below the name field 44.

Since the remaining items of the phone book list, configuring the phone book list screen, are similar to those of a typical phone book list, a detailed description will be omitted in the following discourse.

If the notification bar 45 is selected (e.g., touched or tapped) on the screen as shown in diagram 410, the controller 110 arranges and displays one or more contacts (contact details) including mobile advertising messages according to a preset rule. For example, the controller 110 may first display contacts including unidentified mobile advertising messages on the screen as shown in diagram 420. In that case, the controller 110 may visually, distinctively display the contacts including unidentified mobile advertising messages. The controller 110 may display the background of the fields of contacts including unidentified mobile advertising messages, in different colors, for example. It should be understood that the visual distinction between contacts is not limited to the use of different colors in the background of the fields of contacts according to the exemplary embodiment of the present invention. For example, the visual distinction between contacts may also be implemented in such a way that the font, font size, text color, and the like, of contacts may be set to differ from each other.

If one of the items is selected on the screen as shown in diagram 420, the controller 110 controls the display unit 130 to display the details of the selected item on the screen, i.e., a detail display screen. For example, if the second item, McDonalds, is selected on the screen as shown in diagram 420, the controller 110 controls the display unit 130 to display the details of McDonalds on the detail display screen as shown in diagram 430. The detail display screen displays an indicator area 10, a phone book display area 20 for displaying registered contacts, and an area 30 for displaying one or more mobile advertising messages transmitted from the advertiser. The phone book display area 20 includes a name area 20a and a contact display area 20b. The name area 20a shows a representative image, name or nickname, and a portion of a mobile advertisement. The mobile advertising message display area 30 shows at least one of a coupon, an invitation, and a stamp card, included in the mobile advertising message.

According to an exemplary embodiment of the present invention, the mobile advertising message shows an image of a coupon as shown in diagram 430. The coupon image may include a phrase "Tap to unlock" indicating that the coupon has not been downloaded. If a touch (e.g., a tap) is made on the image of a coupon that has not been downloaded, hereinafter called a first coupon image 31, the controller 110 transmits the signal for requesting the download of the coupon to the mobile advertising server 200, and downloads the coupon. If the coupon has been downloaded to the mobile device 100, the controller 110 converts the first coupon image 31 into a second coupon image 32 of a coupon that has been downloaded, and controls the display unit 130 to display the second coupon image 32 on the screen as shown in diagram 440. The difference between the first 31 and second 32 coupon images is that the second coupon image 32 further shows discount details and the bar code.

FIGS. 5A to 5C illustrate screens that describe the method for receiving a mobile advertising message with an invitation according to an exemplary embodiment of the present invention.

Referring to FIGS. 5A-5C, if a selection (e.g., a tap) is made on a mobile advertising message including an invitation, the controller 110 controls the display unit 130 to display a mobile advertising message display area 30 showing an image 51 of an invitation, i.e., a first invitation image, on the detail display screen. The first invitation image 51 shows invitation content, date and time, place, and a submenu group 52 for selecting one of the submenus, Attending 52a, Maybe 52b, and No Thanks 52c. If one of the submenus in the group 52 is selected, the controller 110 converts the first invitation image 51 into a second invitation image 53 of a selected invitation image, and controls the display unit 130 to display the second invitation image 53. The second invitation image 53 varies according to the submenus selected from the group 52, which is shown in FIG. 5B.

If one of the submenus, Attending 52a, is selected from the submenu group 52 in the first invitation image 51, the controller 110 converts the first invitation image 51 to a second invitation image 53a corresponding to attendance, and then controls the display unit 130 to display the second invitation image 53a where a phrase, "I'm going to attend," is shown, as shown at the top of FIG. 5B.

If Maybe 52b, is selected from the submenu group 52 in the first invitation image 51, the controller 110 converts the first invitation image 51 to a second invitation image 53b corresponding to suspension, and then controls the display unit 130 to display the second invitation image 53b where a phrase, "Maybe I'm not sure," is shown, as shown at the middle of FIG. 5B.

If No Thanks 52c, is selected from the submenu group 52 in the first invitation image 51, the controller 110 converts the first invitation image 51 to a second invitation image 53c corresponding to non-attendance, and then controls the display unit 130 to display the second invitation image 53c where a phrase, "No Thanks," is shown, as shown at the bottom of FIG. 5B.

If Attending 52a or Maybe 52b, is selected from the submenu group 52 in the first invitation image 51, the controller 110 may register the event described in the invitation in the schedule management program (e.g., a calendar). The controller 110 extracts information regarding the event from the metadata of the invitation corresponding to attendance or suspension and then registers the event based on the extracted information in the schedule management program. For example, as shown in diagram 510 of FIG. 5C, the controller 110 may register an event in a date field (e.g., September 30) in the schedule management program 54 (e.g., a calendar). If the user selects (taps) the date field (September 30) in the calendar 54, the controller 110 controls the display unit 130 to highlight the date field and to display the content 55 of the event registered in the date at the bottom of the calendar 54. If the date field (September 30) is selected (e.g., via a long touch action) or the content 55 of the event registered in the date is selected (e.g., via a tap action), the controller 110 controls the display unit 130 to display the details of the event on the screen as shown in diagram 520 of FIG. 5C.

FIG. 6 illustrates screens that describe a method for receiving a mobile advertising message with a stamp card according to an exemplary embodiment of the present invention.

Referring to FIG. 6, the controller 110 controls the display unit 130 to display a mobile advertising messages display area 30 showing an image 61 of a first stamp card, i.e., first stamp card image, on the detail display screen. As shown in diagram 610, the first stamp card image 61 shows a stamp card name, stamp card information, a download menu 62a, and a call free menu 62b. If the download menu 62a is selected (e.g., tapped), the controller 110 alters the first stamp card image 61 to a second stamp card image 63 and controls the display unit 130 to display the second stamp card image 63 as shown in diagram 620. The second stamp card image 63 shows a stamp blank 63a, stamped according to the frequency of usage and the remaining number to be redeemed, a call free menu 62b, usage, and validity date. The call free menu 62b may be displayed as being disabled or may not be displayed, if the advertiser has not offered the call free menu 62b. The blank stamp part 63a may include a preset number of blanks (e.g., ten).

The color of the blank stamp part 63a may also vary each time the user uses the outlet or the chain store that issued the stamp card. The mobile device 100 receives the settlement information via a short-range wireless communication unit (e.g., RFID, NFC, etc.) or text message. When receiving the settlement information, the mobile device 100 may alter the background color of the blank stamp part 63a of the stamp card image. When the mobile device 100 receives the settlement information, the mobile device 100 extracts contact details of a businessperson (or advertiser) from the settlement information, and alters the stamp blank part of the stamp card image associated with the extracted contact details. If the businessperson (or advertiser) permits the settlement, the information regarding the number of stamps may be included in the settlement information. If a customer orders a number of items, the businessperson may include information for altering the color of blanks of the blank stamp part, corresponding to the number of items, in the settlement information.

Although the methods according to the first exemplary embodiment of the present invention are described via the screens shown in FIGS. 4 to 6, it should be understood that the invention is not limited to the illustrated screens.

Figure 7:
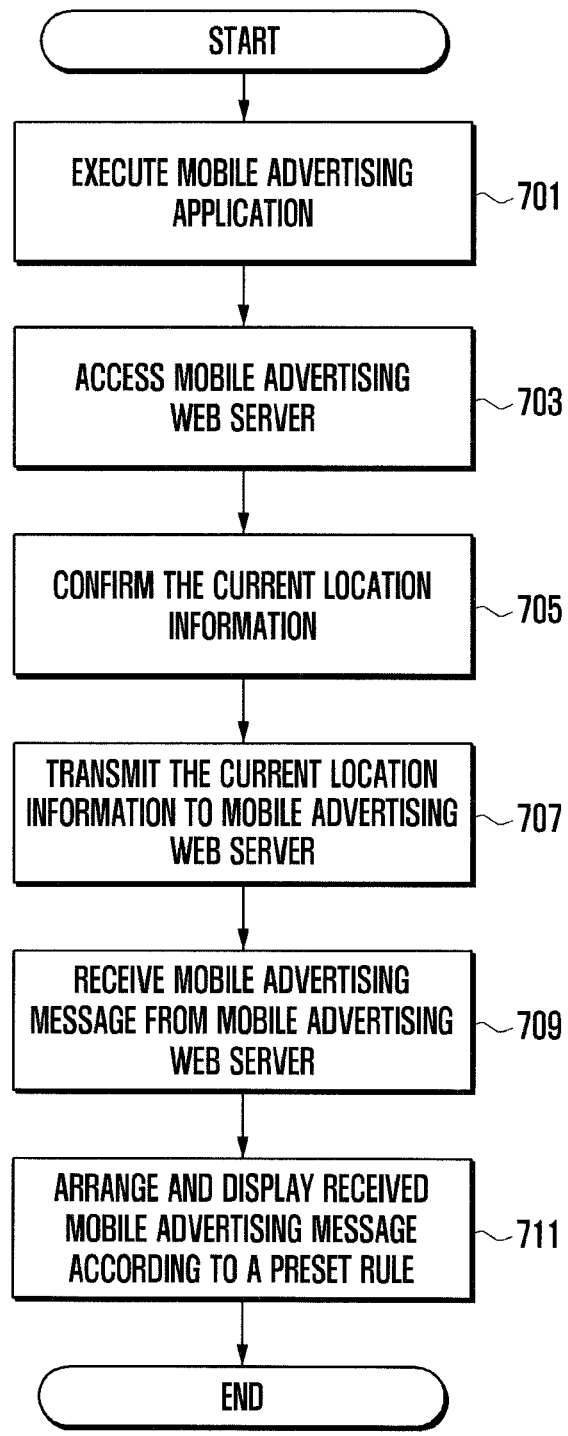
FIG. 7 illustrates a method for receiving a mobile advertising message according to a second exemplary embodiment of the present invention.

FIG. 7 illustrates a flowchart that describes a method for receiving a mobile advertising message according to a second exemplary embodiment of the present invention.

Referring to FIG. 7, the controller 110 executes a mobile advertising application in step 701. The controller 110 accesses the mobile advertising web server 600 in step 703. As part of this process, the controller 110 should perform a user authentication procedure. For example, the controller 110 may output a log-in screen showing ID and password fields, and, transmits, if the user enters the ID and password to the field, the credentials to the mobile advertising web server 600, thereby completing the user authentication procedure. Alternatively, if an automatic log-in function is set in the mobile device 100, the controller 110 does not output the log-in screen when the mobile advertising application is executed and transmits the ID and password that was stored to the mobile advertising web server 600, thereby completing the user authentication procedure.

When accessing the mobile advertising web server 600 at step 703, the controller 110 determines the current location of the mobile device 100 in step 705. To this end, the controller 110 activates the location information receiving unit 170. After determining the current location at step 705, the controller 110 transmits the information regarding the current location to the mobile advertising web server 600 in step 707.

The controller 110 receives mobile advertising messages from the mobile advertising web server 600 in step 709. The mobile advertising messages transmitted from the web server 600 may be mobile advertising messages issued by advertisers within a certain range of area from the current location. The range of area may be set by the mobile device's user. Alternatively, the mobile advertising messages transmitted from the web server 600 may be mobile advertising messages issued by advertisers who have been registered in the phone book of the mobile device 100.

After receiving the mobile advertising messages at step 709, the controller 110 arranges and displays them according to a preset rule in step 711. For example, the controller 110 may display, in order, mobile advertising messages issued by advertisers who have a history where at least one of their coupon, invitation, and stamp card was downloaded; mobile advertising messages issued by advertisers who have been registered in the phone book of the mobile device 100; and other, received mobile advertising messages. These other received messages may include any remaining received mobile advertising messages. If the received mobile advertising messages have the same priority, the controller 110 may display the mobile advertising messages in order of distance between the current location of the mobile device 100 and the locations of the issuing advertisers. If one of the mobile advertising messages is selected (e.g., tapped) on the screen, the controller 110 outputs the details thereon, which is described below with respect to FIGS. 8 to 16.

FIGS. 8 to 16 illustrate screens that describe a method for receiving a mobile advertising message according to the second exemplary embodiment of the present invention.

Figure 8:
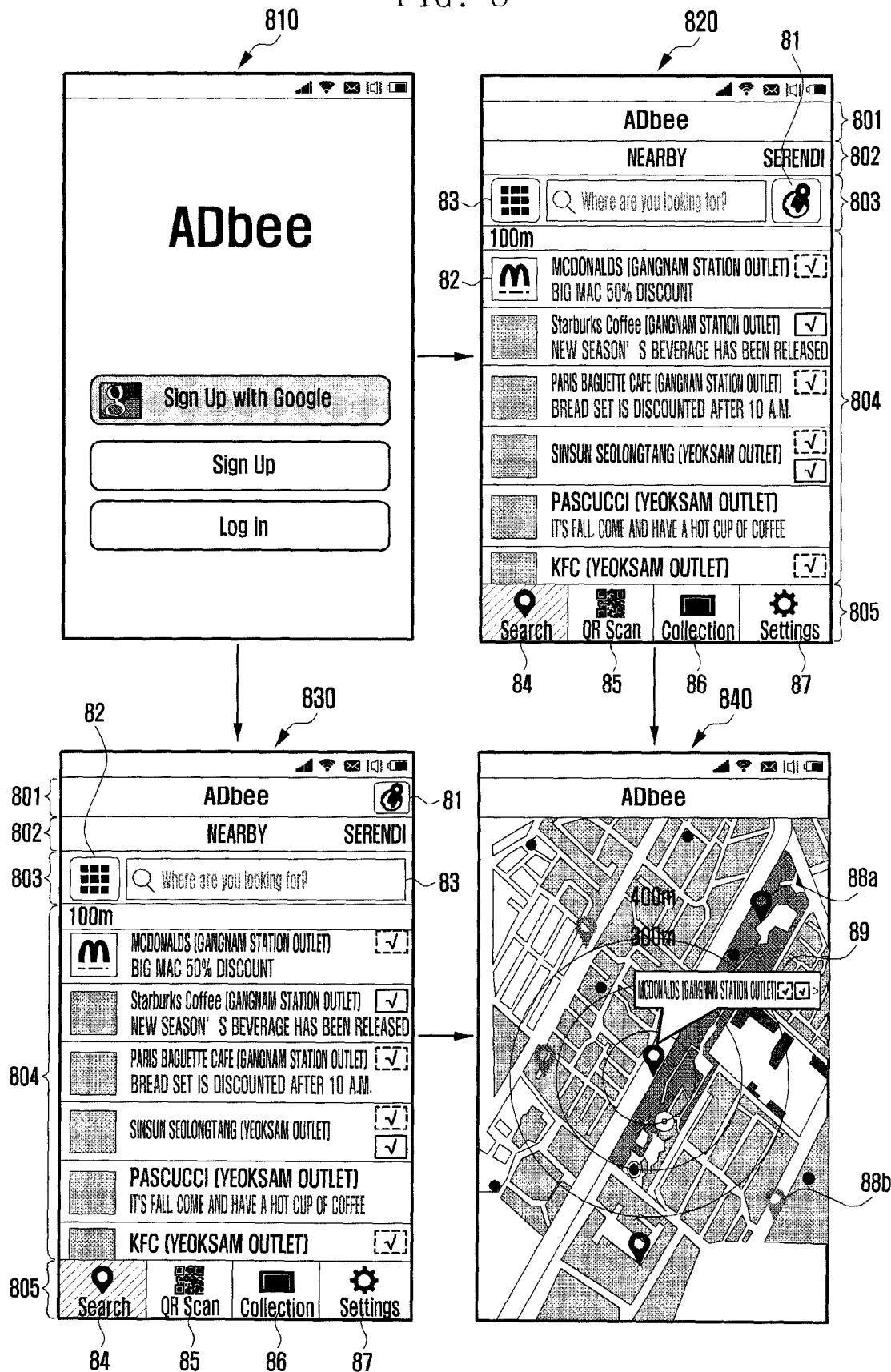
FIGS. 8 to 16 illustrate screens that describe methods for receiving mobile advertising messages according to the second exemplary embodiment of the present invention.
Figure 9:
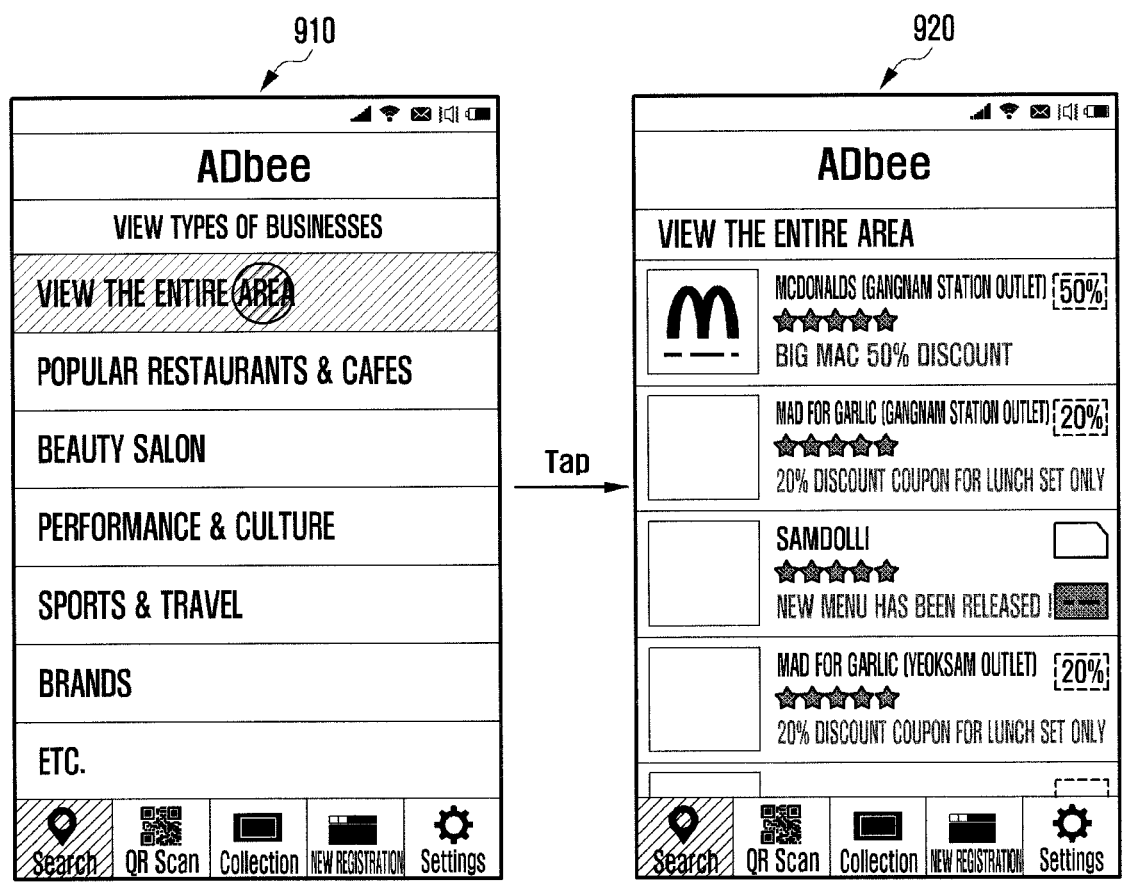

Referring to FIGS. 8 and 9, when the mobile advertising application is executed, the controller 110 outputs a log-in screen to access the mobile advertising web server 600 as shown in diagram 810. After completing the user authentication procedure via the log-in screen, the controller 110 outputs a screen that displays the received mobile advertising messages as shown in diagram 820 or 830. The screens shown in diagrams 820 and 830 are displaying the same mobile advertising messages, except that the locations where the map view menus 81 are located differ from each other. The map view menu 81 in the screen shown in diagram 820 is included in the search area 803. The map view menu 81 in the screen shown in diagram 830 is included in the name area 801.

The mobile advertising message receiving screen includes a name area 801, a search mode selection area 802, a search area 803, an advertisement list area 804, and a menu area 805. The name area 801 displays the name of the mobile advertising application. The search mode selection area 802 allows the user to select one of the modes for searching for received mobile advertising messages. Examples of the search modes include Nearby, Serendipity, Popular, Business Category, Advertisement type, and the like. The search mode may be set to arrange received mobile advertising messages in order of 'Nearby,' as a default. If the mobile advertising application is executed, the controller 110 controls the display unit 130 to arrange and display the received mobile advertising messages in order of "nearby." The user may make a drag or flick gesture on the search mode selection area 802 on both sides to alter the search modes.

The search area 803 includes a category selection menu 82 for selecting categories of mobile advertising messages and a keyword input field 83 for receiving a user's input keyword for searching for a mobile advertising message. The advertisement list area 804 displays received mobile advertising messages arranged according to a preset rule. The menu area 805 includes sub-menus for controlling the mobile advertising application, e.g., a search menu 84, a QR scan menu 85, a collection menu 86, and a setting menu 87. The search menu 84 activates the operation of searching for mobile advertising messages in a selected search mode. The search menu 84 is automatically executed, as a default operation, when the mobile advertising application is executed.

The QR scan menu 85 activates a mode for scanning QR codes included in mobile advertisements issued by advertisers. The collection menu 86 moves to a collection for storing coupons, invitations, stamp cards, and the like, that are downloaded. The setting menu 87 activates a mode for setting user information (e.g., ID, password, etc.) and information associated with a Social Network Service (SNS).

If the map view menu 81 is selected (e.g., touched or tapped) on the screen as shown in diagram 820 or 830, the controller 110 displays the locations of advertisers who issued mobile advertisements (such as coupons, invitations, stamp cards, etc.) that are available, on the map on the screen as shown in diagram 840. During the display of the locations of advertisers, the controller 110 distinguishes between advertisers (or businesspeople) that issued coupons, invitations, and the like, stored in the collection, and advertisers (or businesspeople) that issued coupons, invitations, and the like, not stored in the collection. For example, the controller 110 may display the markers representing advertisers in different colors as shown in diagram 840, where the marker 88a represents an advertiser (or businessperson) that issued coupons, invitations, and the like, stored in the collection and the marker 88b represents an advertiser (or businessperson) that issued coupons, invitations, and the like, not stored in the collection. If one of the markers is selected on the map, the controller 110 displays brief information regarding a mobile advertisement registered by the advertiser on a pop-up window 89. If there are a number of mobile advertisements, the controller 110 displays mobile advertisements including coupons (or stamps), starting from the highest discount rate, one by one, via the pop-up window 89, at preset intervals. If a corresponding pop-up window 89 is selected, the controller 110 displays the details of the mobile advertisement on the detail display screen.

If a drag or flick event occurs on the search mode selection area 802, the controller 110 alters search modes. For example, if a search mode by types of businesses is selected by a drag or flick event on the search mode selection area 802, the controller 110 controls the display unit 130 to display a business category screen as shown in diagram 910 of FIG. 9. If one of the business categories is selected (e.g., tapped) on the screen shown in diagram 910, the controller 110 controls the display unit 130 to display a list of mobile advertisements issued by advertisers (or businesspeople) corresponding to the selected business type.

Figure 10:
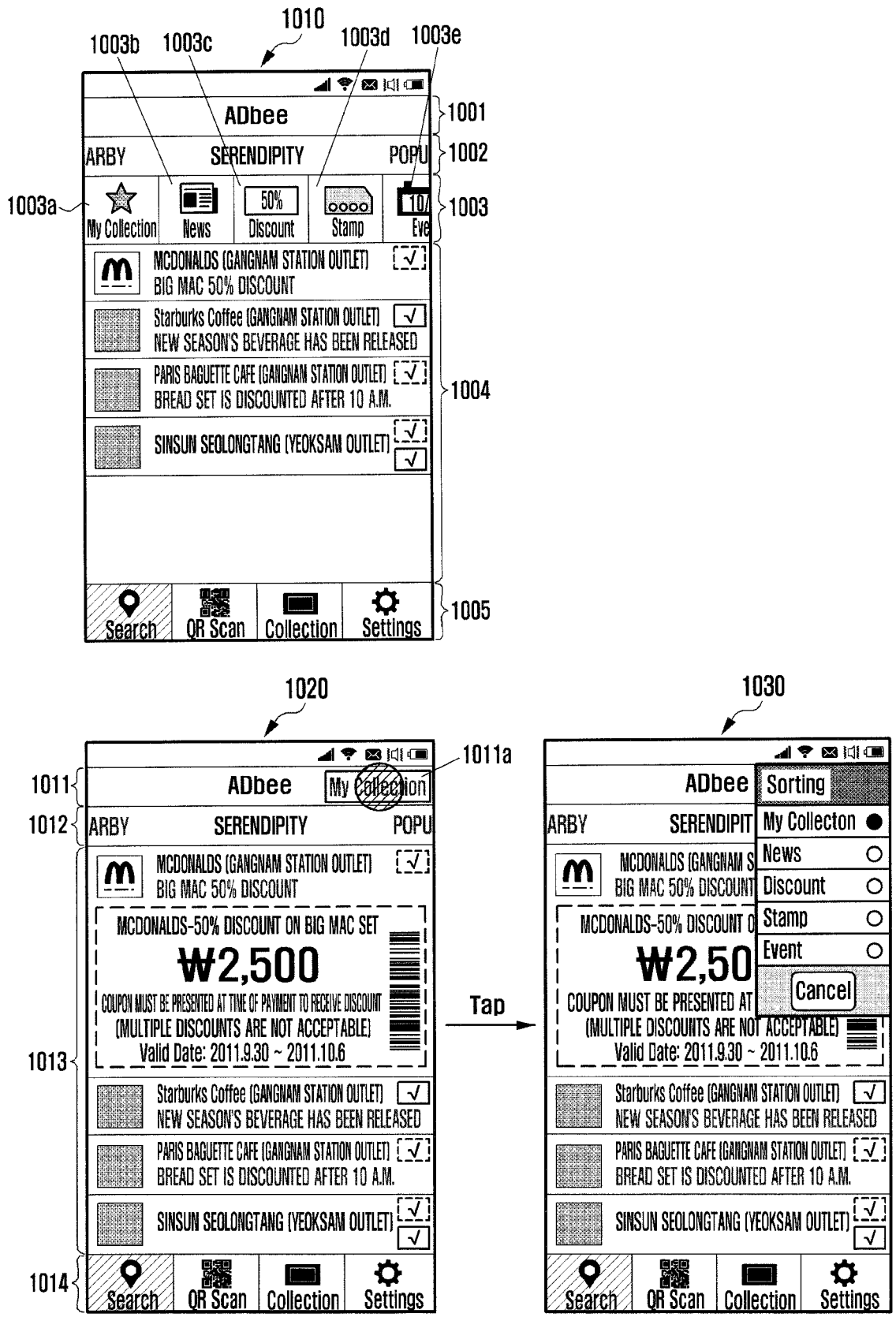

Referring to FIG. 10, if a search mode according to serendipity 'serendipity' is selected by a drag or flick event on the search mode selection area 802 on the screen as shown in diagram 820 or 830, the controller 110 controls the display unit 130 to sort and display mobile advertising messages according to serendipity. The screen outputting mobile advertising messages sorted according to the serendipity search mode, shows a User Interface (UI) as shown in diagram 1010 or 1020 of FIG. 10.

Referring to diagram 1010, the screen for outputting mobile advertising messages according to a serendipity search mode, as a first example, includes a name area 1001, a search mode selection area 1002, an arrangement mode selection area 1003, a list area 1004 and a menu area 1005. The arrangement mode selection area 1003 selects one of the modes for arranging mobile advertising messages sorted according to a serendipity search mode. The arrangement mode selection area 1003 includes My Collection 1003a, News 1003b, Coupon 1003c, Stamp 1003d, and Invitation 1003e. The screen as shown in diagram 1010 displays a screen where My Collection 1003a as an arrangement mode is selected (e.g., highlighted). In that case, the controller 110 displays coupons, invitations, and stamps, stored in the collection, in order of item available in the current location, based on the locations of advertisers who issued them.

Referring to diagram 1020, the screen for outputting mobile advertising messages according to a serendipity search mode, as a second example, includes a name area 1011, a search mode selection area 1012, a list area 1013 and a menu area 1014. The second example is featured via an arrangement mode selection menu 1011a located at one side of the name area 1011. The arrangement mode selection menu 1011a may be implemented with a drop down menu. If the arrangement mode selection menu 1011a is selected (e.g., touched, tapped, etc.) on the screen as shown in diagram 1020, the controller 110 outputs a menu list of a number of arrangement modes as shown in diagram 1030, so that one of the arrangement modes may be selected. In addition, the controller 110 may also display respective mobile advertisements with the coupon images or brief information. For example, like the first mobile advertisement item as shown in diagram 1020, the controller 110 may display a mobile advertisement with the coupon image. Alternatively, like the second to fourth mobile advertisement items as shown in diagram 1020, the controller 110 may display mobile advertisements with brief information. If a preset input signal is created in the first mobile advertisement displayed with the coupon image, the controller 110 removes the image from the first mobile advertisement and displays the image with the brief information in a similar format to the second to fourth mobile advertisements. If a preset input signal is created in one of the second to fourth mobile advertisements displayed with the brief information, the controller 110 displays the selected mobile advertisement with the image of a coupon, invitation image, stamp card, or the like.

Figure 11:
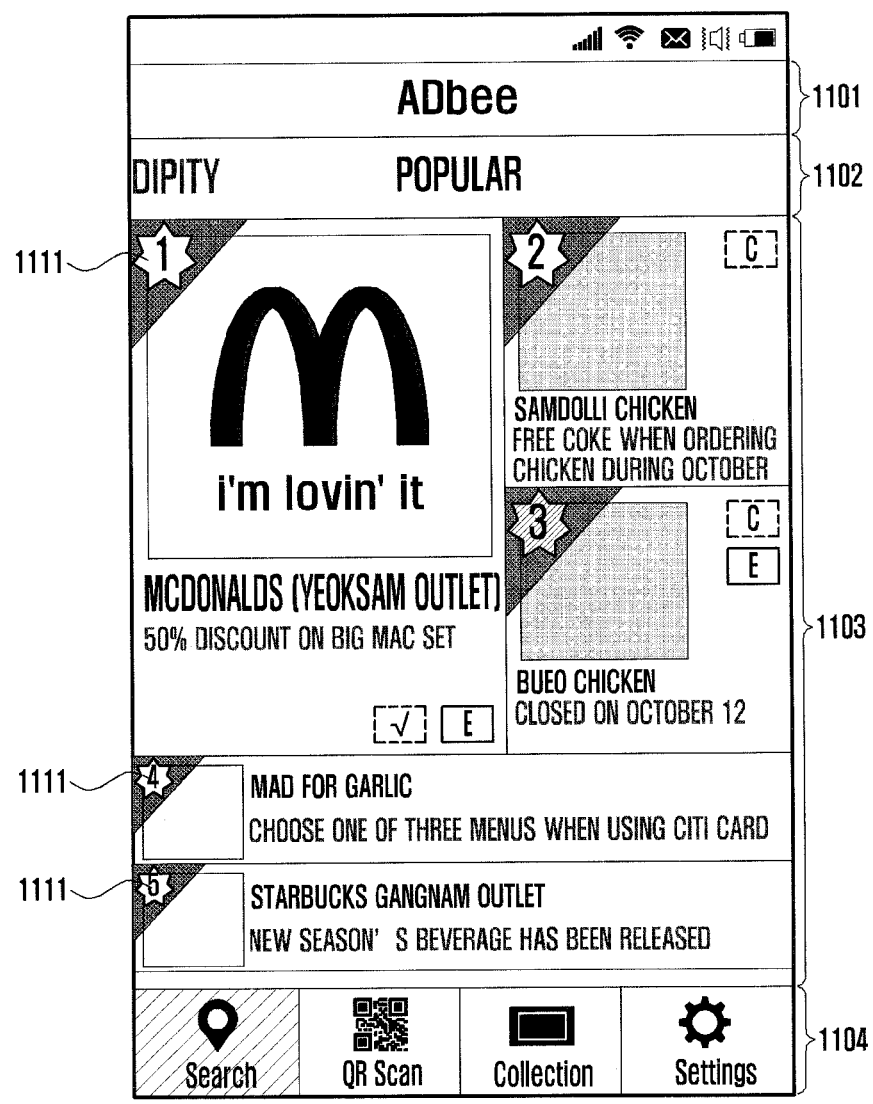

Referring to FIG. 11, according to another exemplary embodiment of the present invention, if a search mode according to popularity 'Popular' is selected by a drag or flick event on the search mode selection area 1102 on the screen as shown in FIG. 11, the controller 110 controls the display unit 130 to sort and display mobile advertising messages according to popularity. The screen outputting mobile advertising messages sorted according to popularity includes a name area 1101, a search mode selection area 1102, a mobile advertisement list area 1103, and a menu area 1104. The mobile advertisement list area 1103 displays mobile advertisements sorted according to popularity. The respective mobile advertisements are displayed with number icons 1111 representing the rank of popularity located at their sides. The mobile advertisements may differ in size from each other according to their rank of popularity. As shown in FIG. 11, the higher the rank of popularity the larger the size of the mobile advertisement on the screen. The lower the rank of popularity the smaller the size of the mobile advertisement on the screen. The mobile advertisement list area 1103 may be scrolled.

Figure 12:
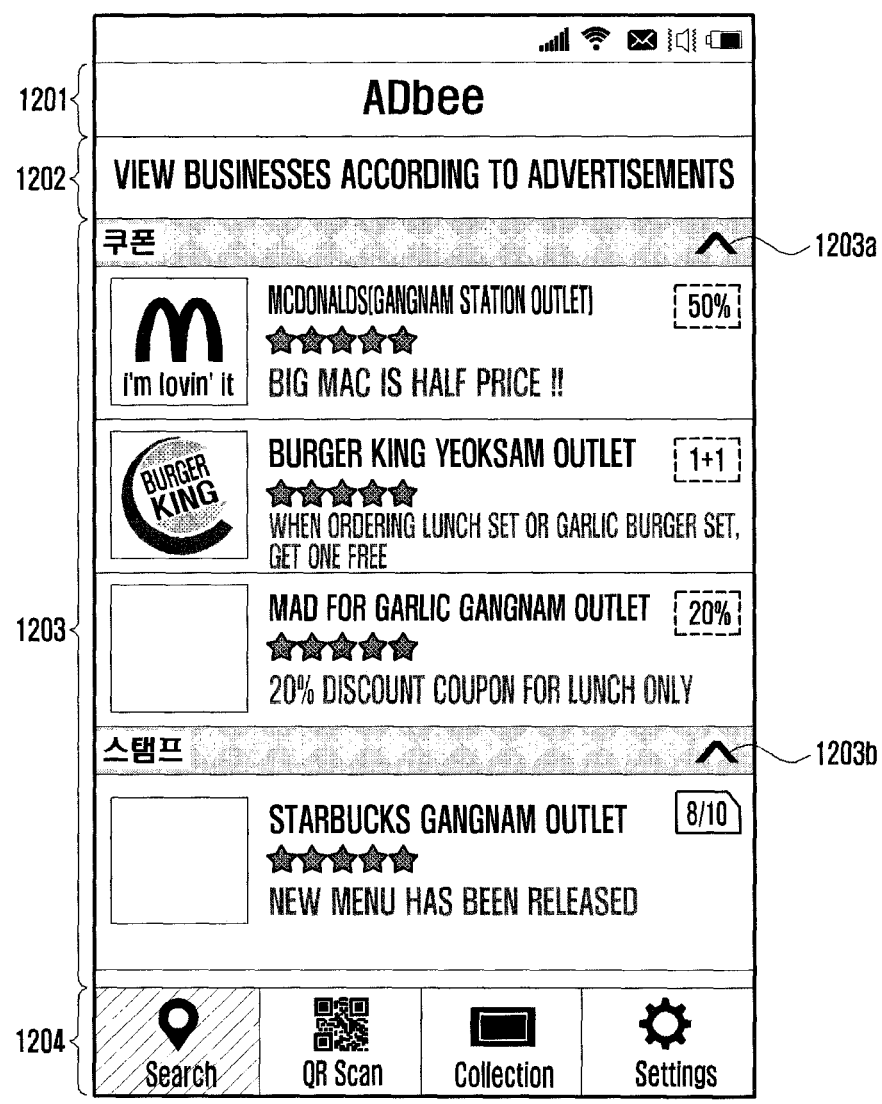

Referring to FIG. 12, according to another exemplary embodiment of the present invention, if a search mode according to the type of advertisement is selected by a drag or flick event on the search mode selection area 802 on the screen as shown in FIG. 8, the controller 110 controls the display unit 130 to sort and display mobile advertising messages according to types of advertisements as shown in FIG. 12. The screen outputting mobile advertising messages sorted according to the types of advertisements includes a name area 1201, a search mode selection area 1202, a mobile advertisement list area 1203, and a menu area 1204. The mobile advertisement list area 1203 displays mobile advertisements, classified into mobile advertisements with coupons and mobile advertisements with stamp cards. The mobile advertisement list area 1203 may be implemented with accordion menus, so that the user may expand or contract the list via the buttons 1203a and 1203b. The mobile advertisement list area 1203 may also be scrolled.

Figure 13:
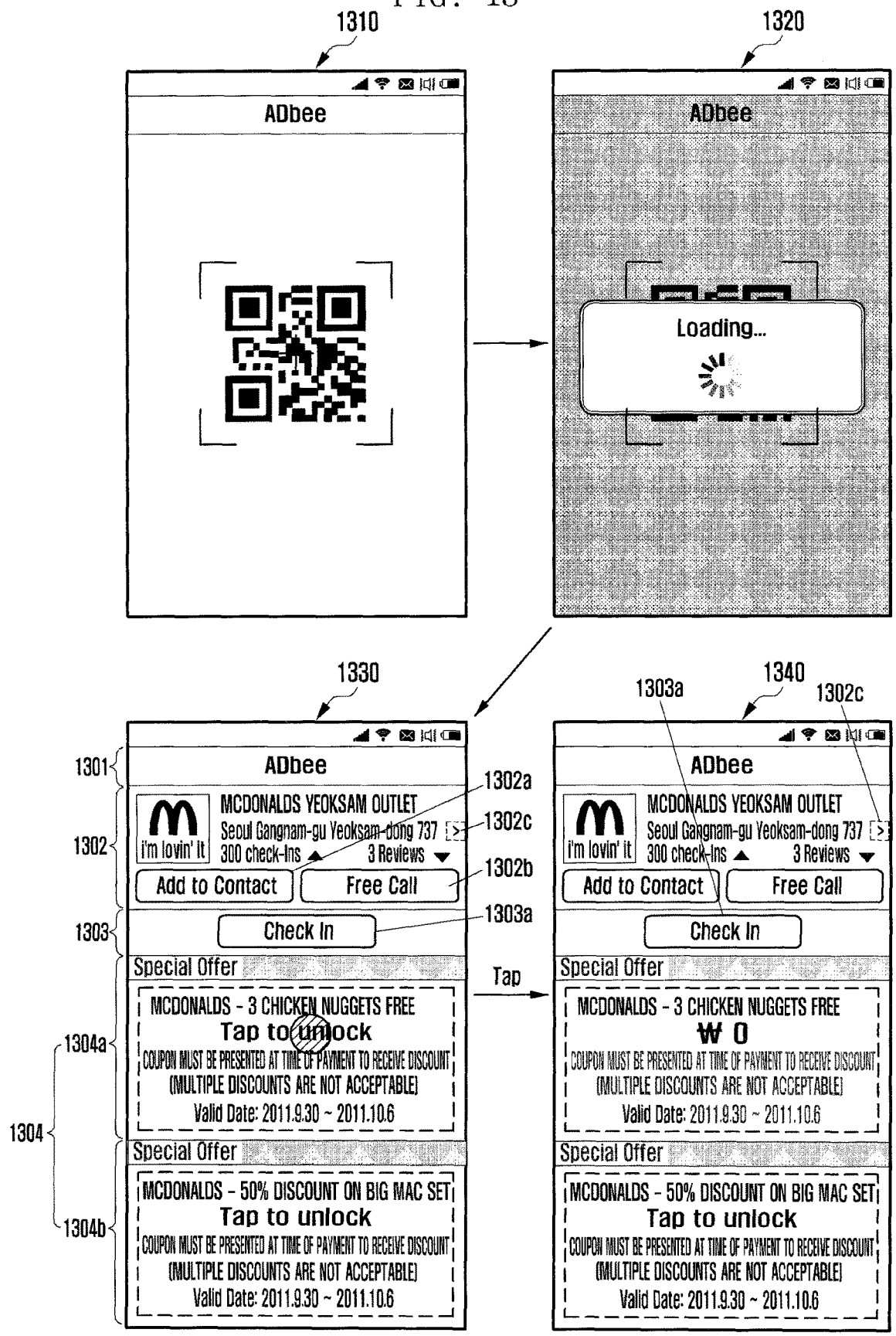

Referring to FIG. 13, if the QR scan menu 85 shown in FIG. 8 is selected, the controller 110 activates the camera unit 195. The controller 110 controls the camera unit 195 to take a QR code image as shown in diagrams 1310 and 1320 of FIG. 13. The controller 110 analyzes the QR code and may receive a mobile advertisement from the advertiser who created the QR code.

When receiving the mobile advertisement, the controller 110 controls the display unit 130 to display a mobile advertisement screen as shown in diagram 1330. The mobile advertisement screen, displaying mobile advertisements received via the QR code, includes a name area 1301, an advertiser information display screen 1302, a check-in menu display area 1303 and a coupon display area 1304. The advertiser information display screen 1302 includes a representative image, an advertiser's name, a mail address, the number of check-ins, the number of reviews, a contact addition menu 1302a, a call free menu 1302b, and a menu 1302c for viewing details. The coupon display area 1304 includes a special offer coupon display area 1304a and a general coupon display area 1304b. The screen as shown in diagram 1330 is a screen before a special offer coupon and a general coupon are downloaded. The screen as shown in diagram 1340 is a screen before a special offer coupon and a general coupon have been downloaded. If a tap event occurs on the image of a special offer coupon or general coupon, the controller 110 may download the special offer coupon or general coupon. Although not shown in FIG. 13, the mobile advertisement screen may further include an invitation display area, a news display area, and the like.

Figure 14:
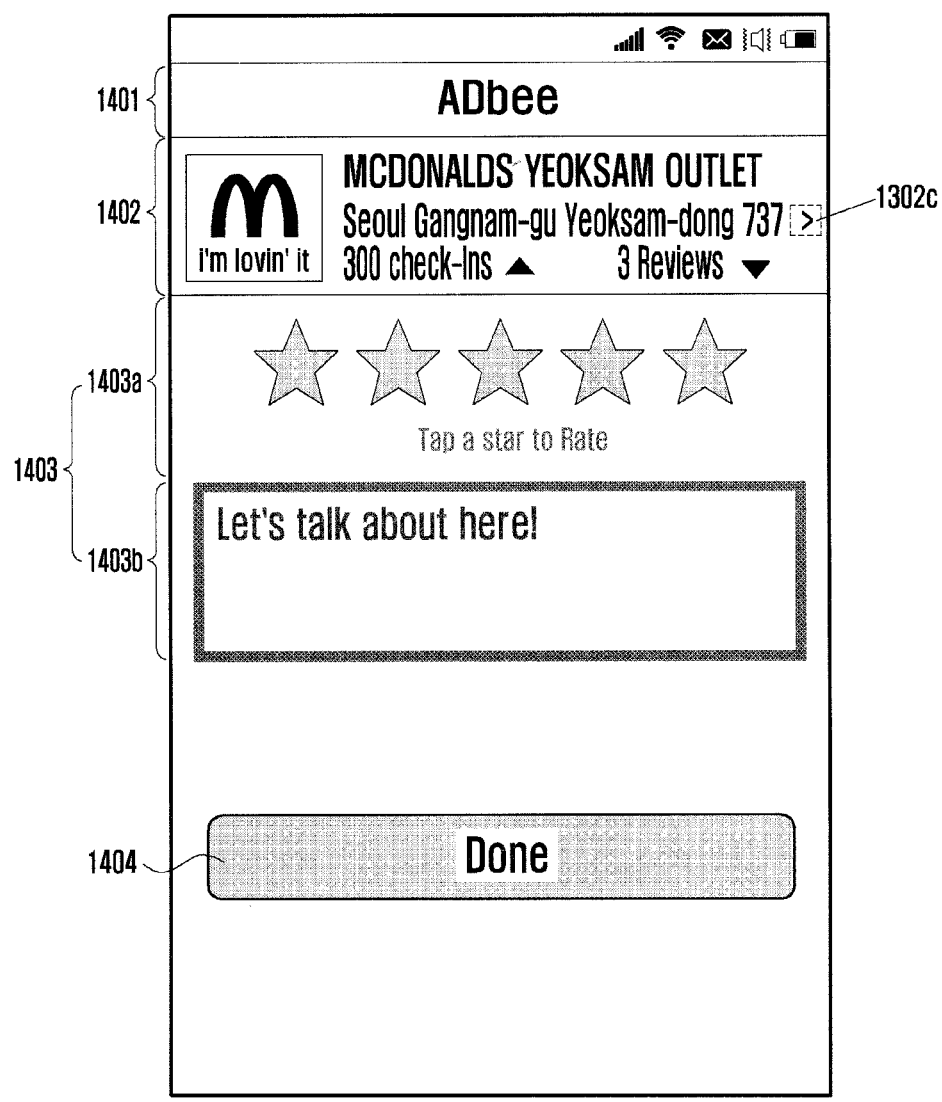

Referring to FIG. 14, if the check-in menu 1303a is activated on the screen as shown in diagram 1330 or 1340, the controller 110 controls the display unit 130 to display a check-in screen as shown in FIG. 14. The check-in screen includes a name area 1401, an advertiser information display area 1402, an estimation area 1403 for estimating an advertiser, and a done menu 1404. The estimation area 1403 includes a star rating area 1403a and a comment area 1403b for allowing users to write comments. The exemplary embodiment of the present invention is implemented in such a way that the screen shows a rating image via five stars as shown in FIG. 14. The star rating for an advertiser is achieved by touching one of the five stars. For example, if the user touches the fourth star icon from the left, the advertiser receives a score of four out of five points. It should be understood that the invention is not limited to a star rating, and that other rating systems may also be employed (such as a letter grade or numerical rating).

If the user selects the done menu 1404, the controller 110 registers the input star rating score and the comment, increases the number of check-ins of a corresponding advertiser by one, and controls the display unit 130 to display the previous screen.

As described above, although the exemplary embodiment of the present invention is implemented in such a way that, when a QR code is scanned via the camera unit 195, the mobile advertisement including the check-in menu and the special offer coupon is displayed on the details display screen, it should be understood that the invention is not limited to the exemplary embodiment of the present invention. For example, if the mobile device 100 receives a mobile advertising message via short-range wireless communication (RFID or NFC), the mobile device 100 may display a check-in menu and special offer coupon on the details display screen.

Figure 15:
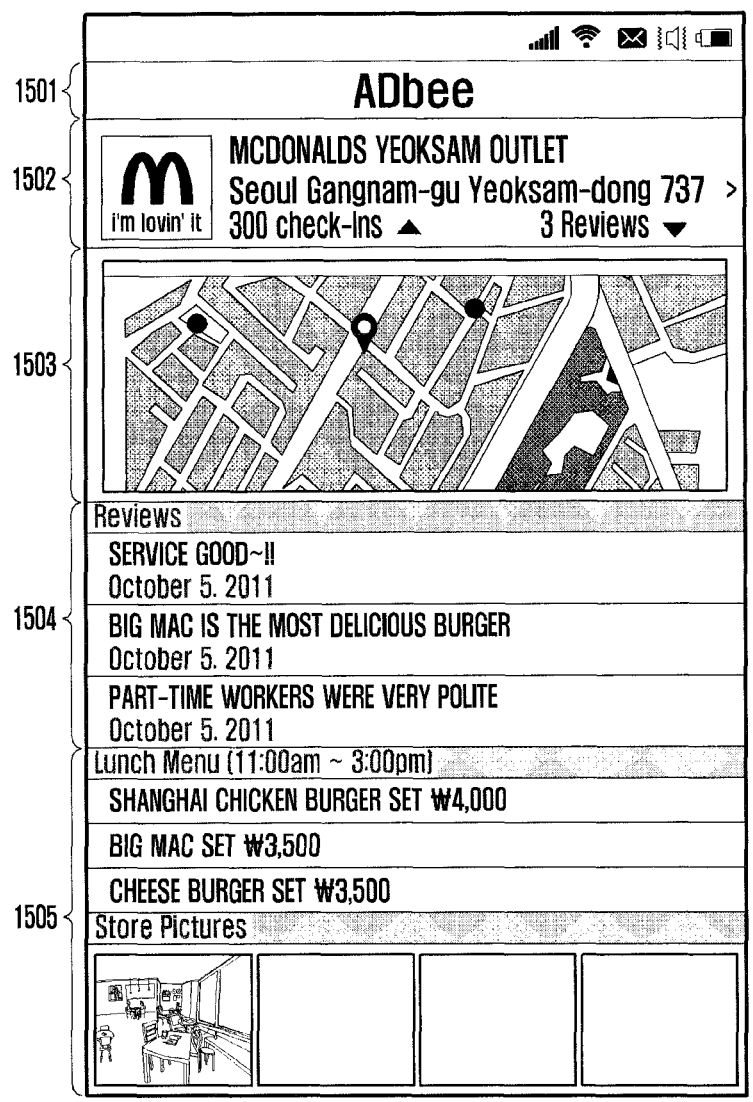

Referring to FIG. 15, if the detail view menu 1302c is activated on the screen as shown in diagram 1330 or 1340 or the screen as shown in FIG. 14, the controller 110 controls the display unit 130 to display details of an advertiser who issued mobile advertisements on the detail display screen as shown in FIG. 15. The detail display screen includes a name area 1501, an advertiser information display area 1502, a map display area 1503, a review area 1504 for posting users' reviews, and an additional information display area 1505 for displaying additional information registered by the advertiser, e.g., business hours, menus, price, interior photos, and the like.

Figure 16:
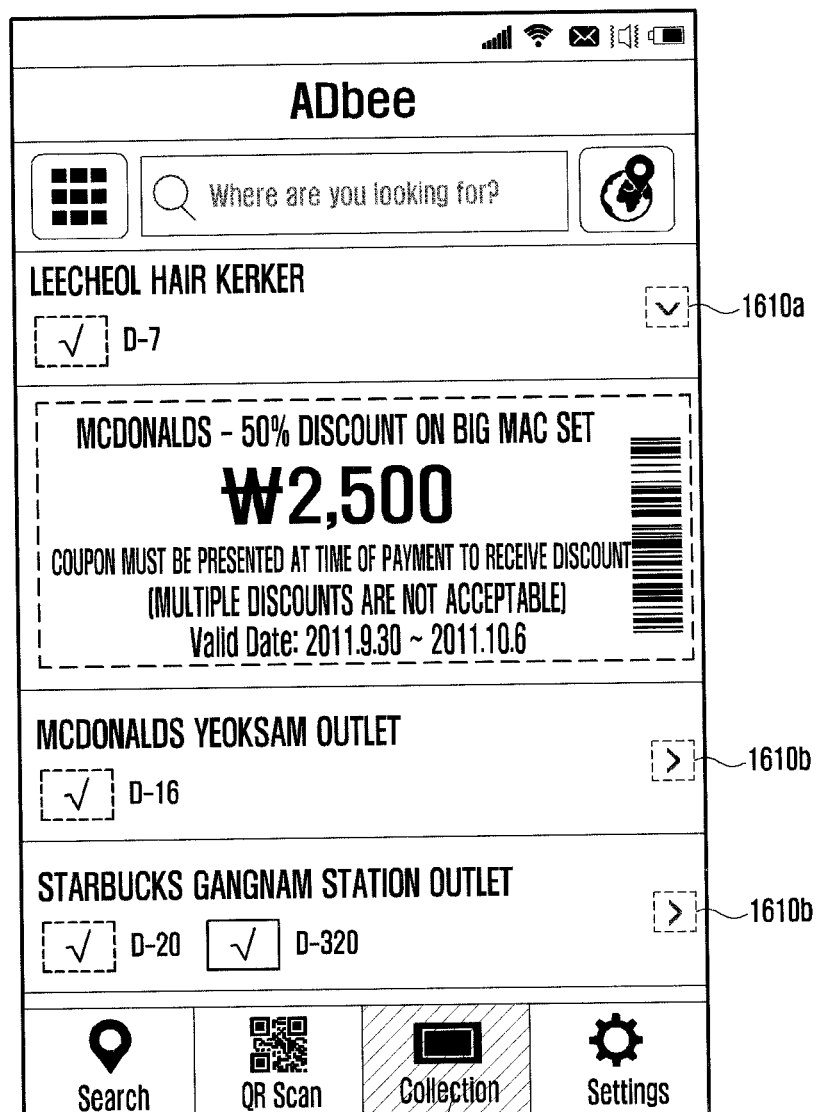

Referring to FIG. 16, if Collection menu 86 shown in FIG. 8 is selected, the controller 110 controls the display unit 130 to display mobile advertisements stored in the collection on the collection display screen as shown in FIG. 16. The collection display screen displays mobile advertisements, stored in the collection, in a list. The controller 110 sorts the mobile advertising messages stored in the collection in order of validity date, and displays the sorted mobile advertising messages on the screen. Each of the mobile advertisements in the list may be displayed via brief information (e.g., name) or further with at least one of the images of coupon, invitation, and stamp card below the brief information, according to a signal created by touching (or tapping) an accordion menu button 1610.

Figure 17:
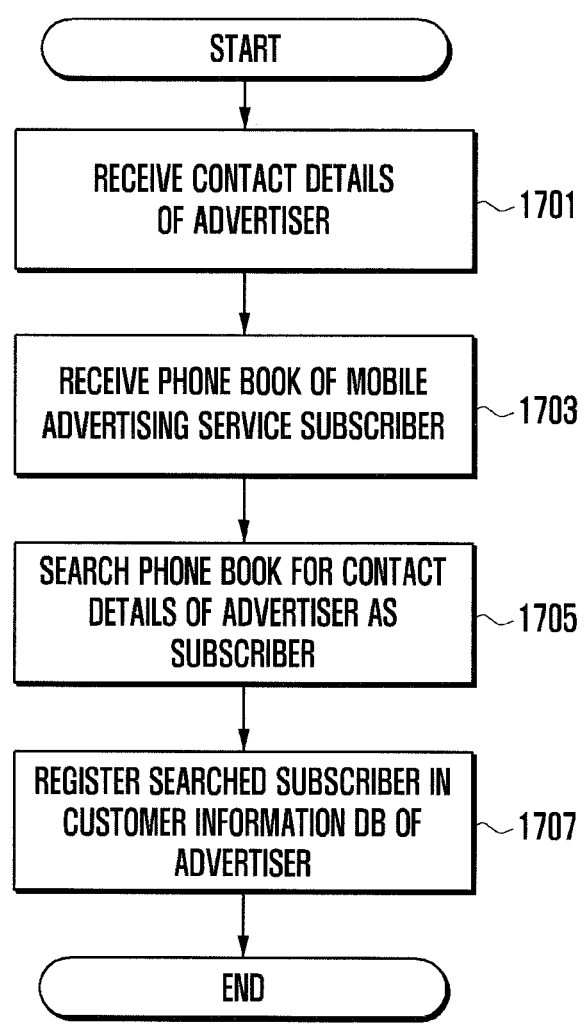
FIG. 17 illustrates a method for managing a customer information database according to an exemplary embodiment of the present invention.

FIG. 17 illustrates a flowchart that describes a method for managing a customer information database according to an exemplary embodiment of the present invention.

Referring to FIG. 17, the mobile advertising server 200 receives information regarding the contact details of advertisers in step 1701. Businesspeople (or advertisers) sign up for the mobile advertising service to register their contacts and information regarding their customers (phone numbers, email addresses, etc.) in the mobile advertising server 200. The businesspeople (advertisers) may register their customers' information in the phone book server 220 of the mobile advertising server 200. The mobile advertising server 200 receives phone books of the mobile advertising service subscribers in step 1703. The mobile advertising server 200 may also determine whether the phone books of the mobile advertising service subscribers are updated. The phone book server 220 of the mobile advertising server 200 determines whether the subscriber adds new contacts to the phone book or corrects the existing contacts in the phone book. To this end, the phone book server 220 should periodically synchronize the phone books with the mobile devices of the subscribers.

The mobile advertising server 200 searches for a subscriber who has registered the contact details of an advertiser in the phone book in step 1705. The phone book server 220 identifies whether the contact details of an advertiser (e.g., a business name, a phone number, etc.) are included in a subscriber's added or modified phone book. The phone book server 220 extracts the phone numbers and a registered company name from the subscriber's phone book and compares the extracted information with the contact details of the advertiser.

The mobile advertising server 200 registers information regarding a subscriber who has registered the contact details of the advertiser in the phone book in a customer database of the advertiser in step 1707. If a phone book of a subscriber includes the contact details of an advertiser, the phone book server 220 may add the phone number of the subscriber in the advertiser's customer database. This allows the advertiser to automatically collect and manage customers' information. The collected customers' information may be managed by the mobile advertising server 200. For example, the mobile advertising server 200 may automatically classify classes of customers based on Customer Relation Management (CRM) information. CRM information includes check-in scores, usage details of stamp cards, coupons, and invitations, items as to whether a customer newly signs up for the service, settlement details, the number of comments, and the like.

As described above, although the exemplary embodiment of the present invention is implemented in such a way that a user's phone number is automatically added to an advertiser's customer database, it should be understood that the invention is not limited to the exemplary embodiment of the present invention. For example, if a user removes the contact details of an advertiser from the phone book in the mobile device, the phone book server 220 may also remove the user's information from the advertiser's customer database.

Figure 18:
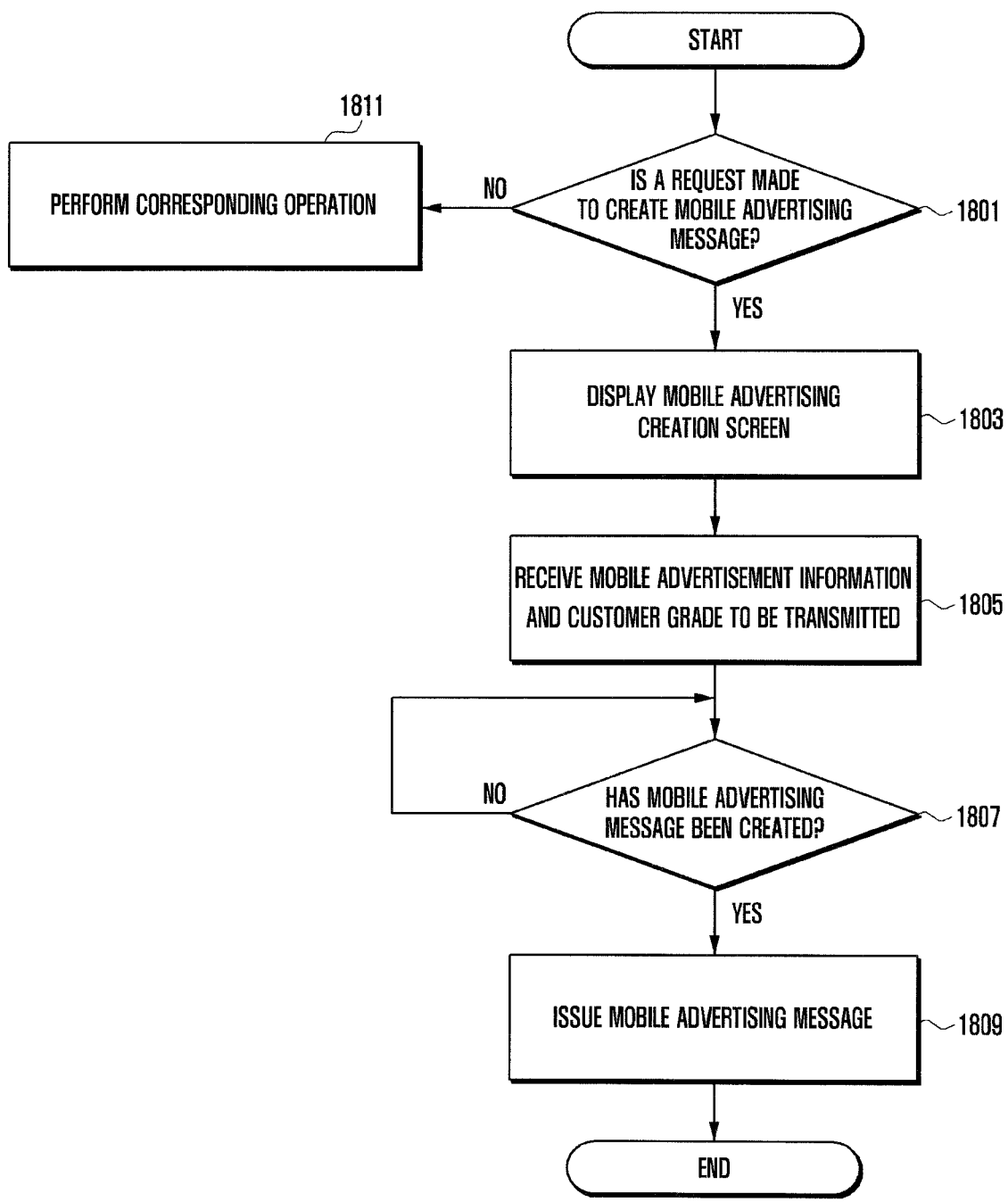
FIG. 18 illustrates a method for issuing mobile advertisements according to an exemplary embodiment of the present invention.

FIG. 18 illustrates a flowchart that describes a method for issuing mobile advertisements according to an exemplary embodiment of the present invention. In the following description, it is assumed that an advertiser (or businessperson) issues the mobile advertisements via a PC 700.

Referring to FIG. 18, the PC 700 determines whether a request is made to create a mobile advertising message in step 1801. The request may be made via web pages that provide a web service for issuing or managing mobile advertisements. The advertiser (or businessperson) enters log-in information on the web page and access the web site to access the system for creating the mobile advertising messages.

If the PC 700 does not detect the request for the creation of a mobile advertising message at step 1801, the PC 700 performs a corresponding operation in step 1811. Examples of the operation are a procedure to create a QR code, a process to display businessperson's details or statistical information regarding the use of mobile advertising messages on the screen, according to the user's request, or the execution of an idle state.

If the PC 700 ascertains that a request has been made to create a mobile advertising message at step 1801, the PC 700 outputs a mobile advertisement creating screen in step 1803. This is described below with respect to FIGS. 20 to 22.

When outputting the mobile advertisement creating screen at step 1803, the advertiser inputs, to the PC 700, information regarding mobile advertisements and the class of customers to which the mobile advertisements will be transmitted in step 1805. The PC 700 determines whether the mobile advertising message has been created in step 1807. For example, the PC 700 detects whether a request is made to transmit a mobile advertisement. If the mobile advertising message has not been created at step 1807, the PC 700 waits until the message has been created. If the mobile advertising message has been created at step 1807, the PC 700 issues the mobile advertising message in step 1809. The PC 700 transmits the mobile advertising message to the mobile devices of the subscribers corresponding to the customer class selected at step 1805. As such, the businessperson (or advertiser) may efficiently issue mobile advertisements, using the customer classes categorized according to the customer information managing method described above referring to FIG. 17. Businesspeople (or advertisers) may issue mobile advertising messages to subscribers friendly to them, thereby maximizing the advertising effect. Examples of the subscribers friendly to a businessperson (or advertiser) include subscribers who have stored the phone numbers of the businessperson (or advertiser) or frequently visited them.

Although exemplary embodiments of the present invention are implemented in such a way that mobile advertisements are issued via a PC, it should be understood that the invention is not limited to the exemplary embodiment of the present invention. For example, mobile advertisements may be issued via a variety of electronic devices that may be connected to the Internet, such as mobile devices, tablet PCs, and the like.

Figure 19:
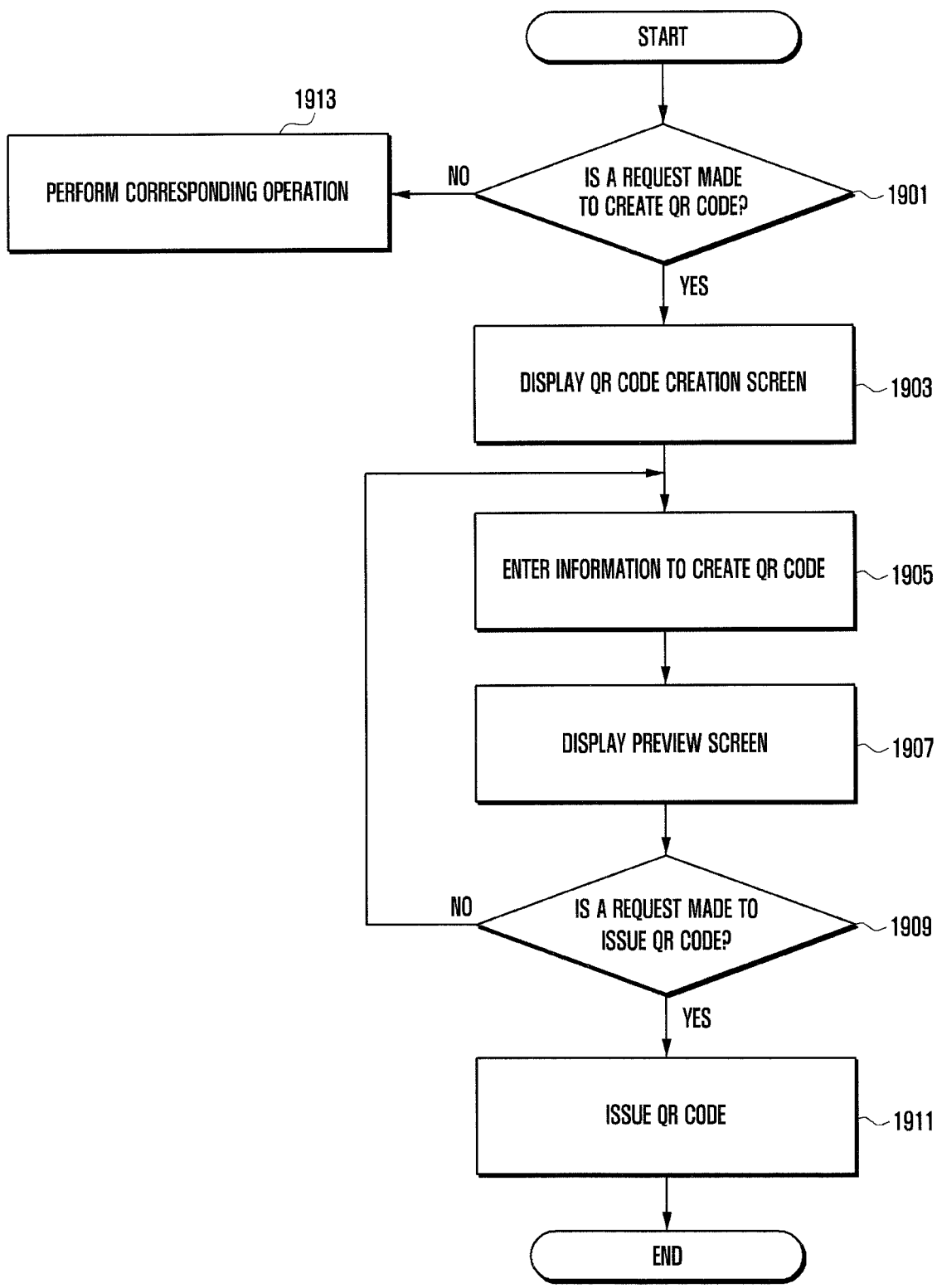
FIG. 19 illustrates a method for creating a Quick Response (QR) code according to an exemplary embodiment of the present invention.

FIG. 19 illustrates a flowchart that describes a method for creating a QR code according to an exemplary embodiment of the present invention. In the following description, it is assumed that an advertiser (or businessperson) issues a QR code for mobile advertising via a PC 700.

Referring to FIG. 19, the PC 700 determines whether a request is made to create a QR code in step 1901. The request may be made via web pages that provide a web service for issuing or managing mobile advertisements.

If the PC 700 does not detect the request for the creation of a QR code at step 1901, the PC 700 performs a corresponding operation in step 1913. Examples of the operation are a procedure to issue a mobile advertising message, a process to display businessperson's details or statistical information regarding the use of mobile advertising messages on the screen, according to the user's request, or the execution of an idle state.

If the PC 700 ascertains that a request has been made to create a QR code at step 1901, the PC 700 controls the display unit 130 to display a QR code creating screen in step 1903. This is described below with respect to FIG. 24.

When displaying a QR code creating screen at step 1903, the advertiser inputs, to the PC 700, information for creating QR codes in step 1905. An example of the information for creating QR codes are information for selecting one of predetermined templates to issue QR codes and a message input to the selected template. The PC 700 display a preview screen of a QR code that will be created, based on the selected template and the input message in step 1907.

The PC 700 determines whether a request is made to issue the QR code in step 1909 via a print menu 2404, which is described below with respect to FIG. 24. If the PC 700 ascertains that a request is not made to issue the QR code at step 1909, the PC 700 returns to step 1905. The PC 700 identifies whether the advertiser alters a template or a message, and controls the display unit 130 to display, a preview screen reflecting the altered information if a template or a message is altered, and to display the current screen if a template or a message is not altered.

If the PC 700 ascertains that a request has been made to issue the QR code at step 1909, the PC 700 creates a QR code using the selected template and the input message in step 1911. If the PC 700 receives a signal for operating a print menu 2404 shown in FIG. 24, the PC 700 may print the QR code image on the preview screen via a printer or store the QR code image in the storage unit.

Although the exemplary embodiment of the present invention is implemented in such a way that a QR code is issued via a PC, it should be understood that the invention is not limited to the exemplary embodiment of the present invention. For example, it may be modified in such a way that a QR code may be issued via a variety of electronic devices that may be connected to the Internet, such as mobile devices, tablet PCs, and the like.

FIGS. 20 to 23 illustrate screens that describe a method for issuing mobile advertisements according to an exemplary embodiment of the present invention.

Referring to FIGS. 20 to 23, an advertiser accesses a web page that provides a web service for issuing and managing mobile advertising messages. The advertiser signs up for the web service, and enters the log-in information registered when signing up the service.

Figure 20:
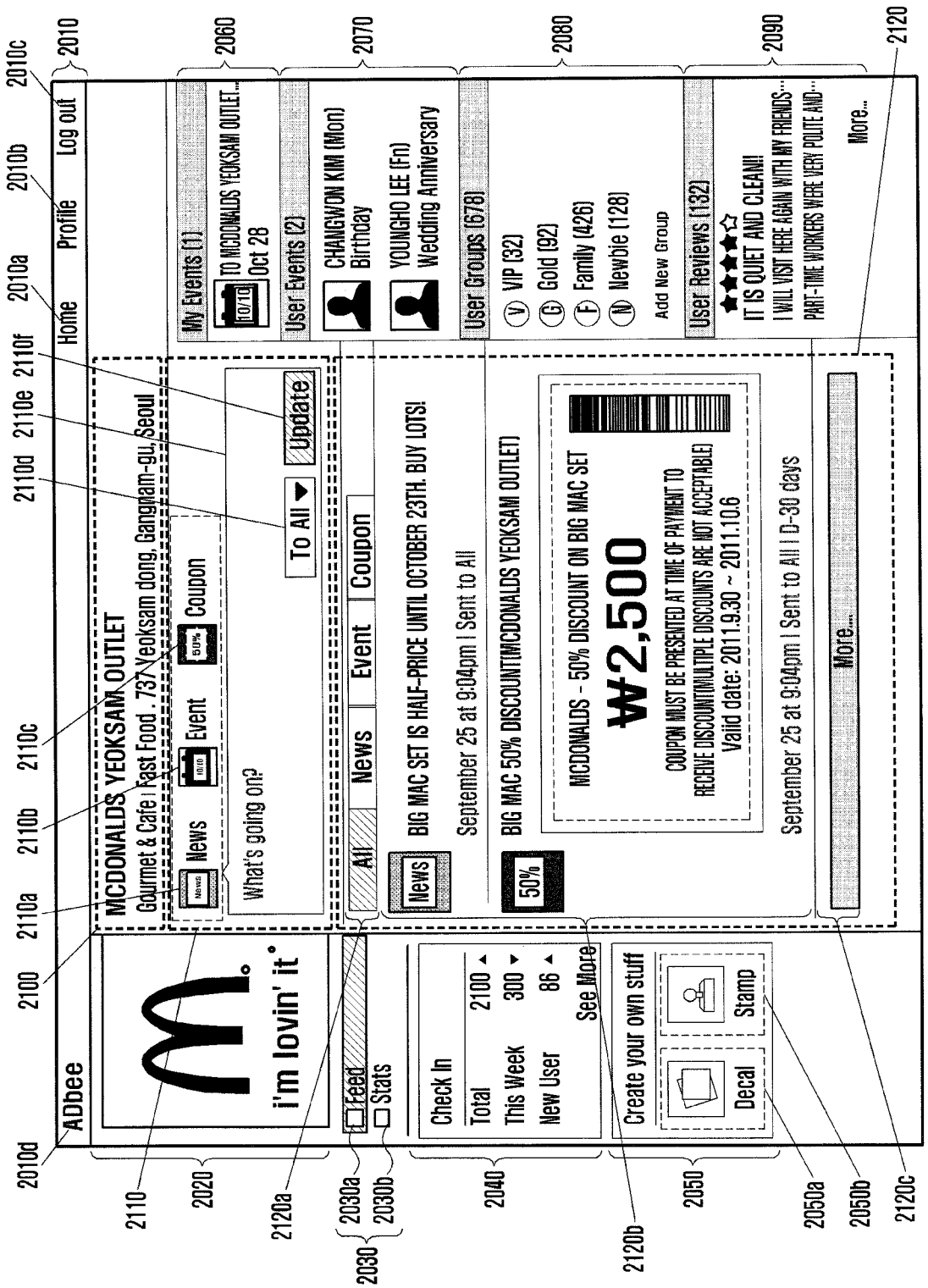
FIGS. 20 to 23 illustrate screens that describe a method for issuing mobile advertisements according to an exemplary embodiment of the present invention.

Upon accessing the web page, the PC 700 outputs an initial web service screen as shown in FIG. 20. The initial screen shows a web service log display area 2010, an advertiser's profile image display area 2020, a first menu area 2030, a check-in information display area 2040 for displaying the number of check-ins according to preset conditions (e.g., total/this week/new user), a second menu area 2050, a first event display area 2060 for displaying events in progress, a second event display area 2070 for displaying information regarding customers who are scheduled to have events in a certain period of time (e.g., in a week), a class display area 2080 for displaying information regarding customers according to classes, a review display area 2090 for displaying reviews posted by users, an area 2100 for displaying an advertiser's information, a mobile advertising message creating area 2110 for displaying mobile advertisement creating menus, and a history display area 2120 for displaying a history of issuing mobile advertisements.

The web service log display area 2010 includes a home menu 2010a for executing the output of the initial screen, a profile information viewing menu 2010b for executing the output of an advertiser's registered profile information screen, a log out men 2010c for executing the log out of the web service, and a web service logo 2010d. The first menu area 2030 includes an issue list viewing menu 2030a and a statistical information viewing menu 2030b. The second menu area 2050 includes a QR code creating menu 2050a for executing the output of a QR code creating screen, and a stamp card creating menu 2050b for executing the output of a stamp card creating screen.

The mobile advertising message creating area 2110 includes a news creating menu 2110a for executing the output of a screen for creating news article from among mobile advertising messages, an invitation creating menu 2110b for executing the output of an invitation creating screen, and a coupon creating menu 2110c for executing the output of a coupon creating screen. If the news creating menu 2110a is executed, the PC 700 displays a text balloon 2110d for entering news content, on the mobile advertising message creating area 2110, as shown in FIG. 20. The text balloon 2110d includes a slide menu 2110e for selecting one of the classes of customers to which news content is transmitted and an update menu 2110f for requesting for the issue of news. The text balloon 2110d may display a message, e.g., "What's going on?" until news content starts to be input. The update menu 2110f may be disenabled until news content starts to be input.

Figure 21:
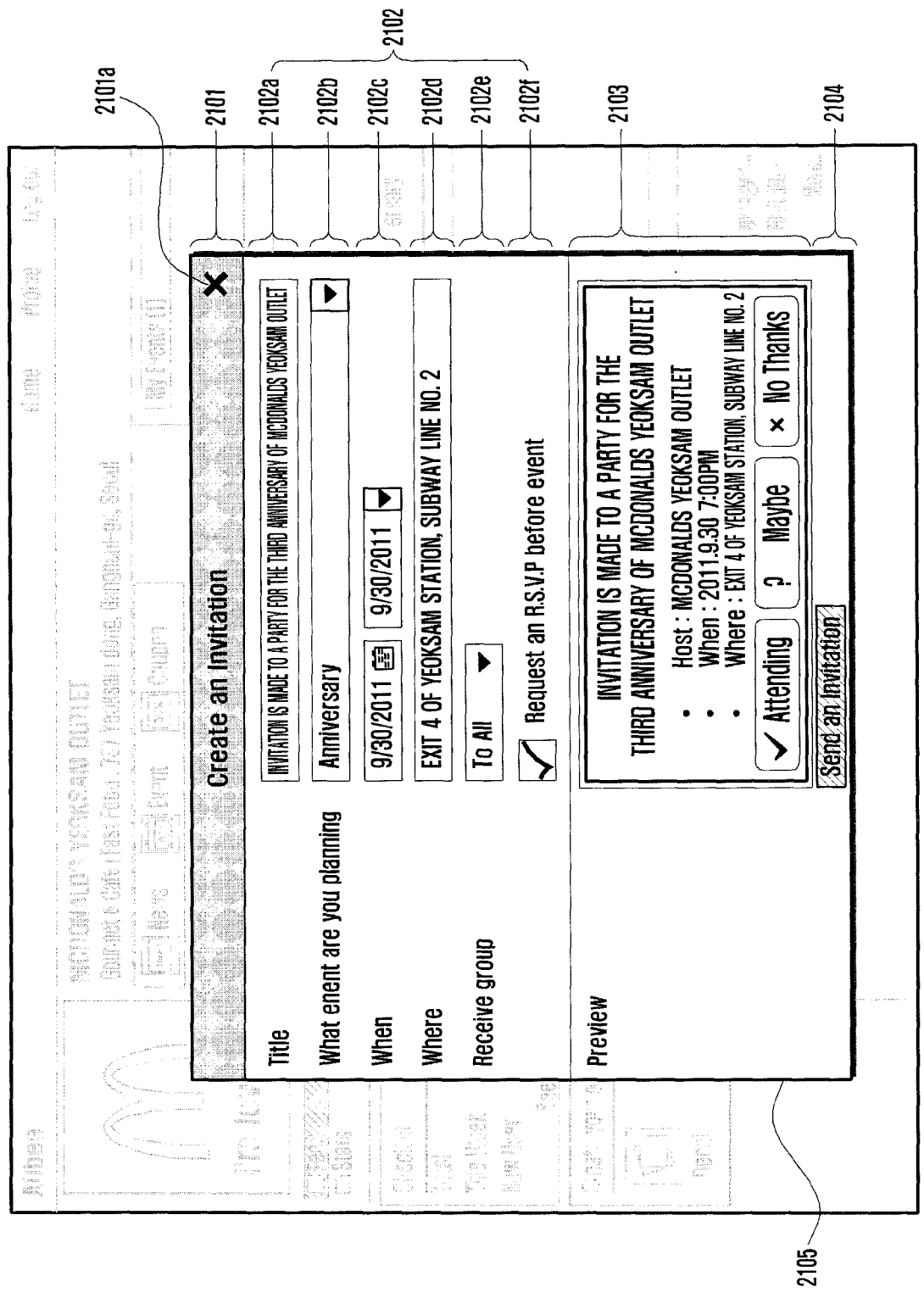

If the invitation creating menu 2110b is executed, the PC 700 displays an invitation creating screen 2105 as shown in FIG. 21. According to an exemplary embodiment of the present invention, the invitation creating screen 2105 is output as a pop-up window. However, it should be understood that the invention is not limited thereto. For example, the invitation creating screen 2105 may be output as the entire screen.

Referring to FIG. 21, the invitation creating screen 2105 includes a title display area 2101 for displaying the title of window, an invitation information input area 2102, a preview area 2103 and an invitation sending menu area 2104. The title display area 2101 displays a phrase for representing the pop-up window to create an invitation, "Create an invitation," and a window close icon 2101a. The invitation information input area 2102 includes a field 2102a for entering the title of an invitation, a field 2102b for selecting a type of invitation, a field 2102c for entering an invitation date, a field 2102d for entering information regarding a place, a class selecting field 2102e for selecting customers to whom an invitation is transmitted, and a replay function selecting field 2102f for selecting an option as to whether to add a reply function to an invitation. The preview area 2103 displays a preview image of the invitation based on information input to the invitation information input area 2102. The invitation sending menu area 2104 includes a transmission menu for executing the transmission of an invitation to a mobile device of a customer with a class, selected via the class selecting field 2102e.

Figure 22:
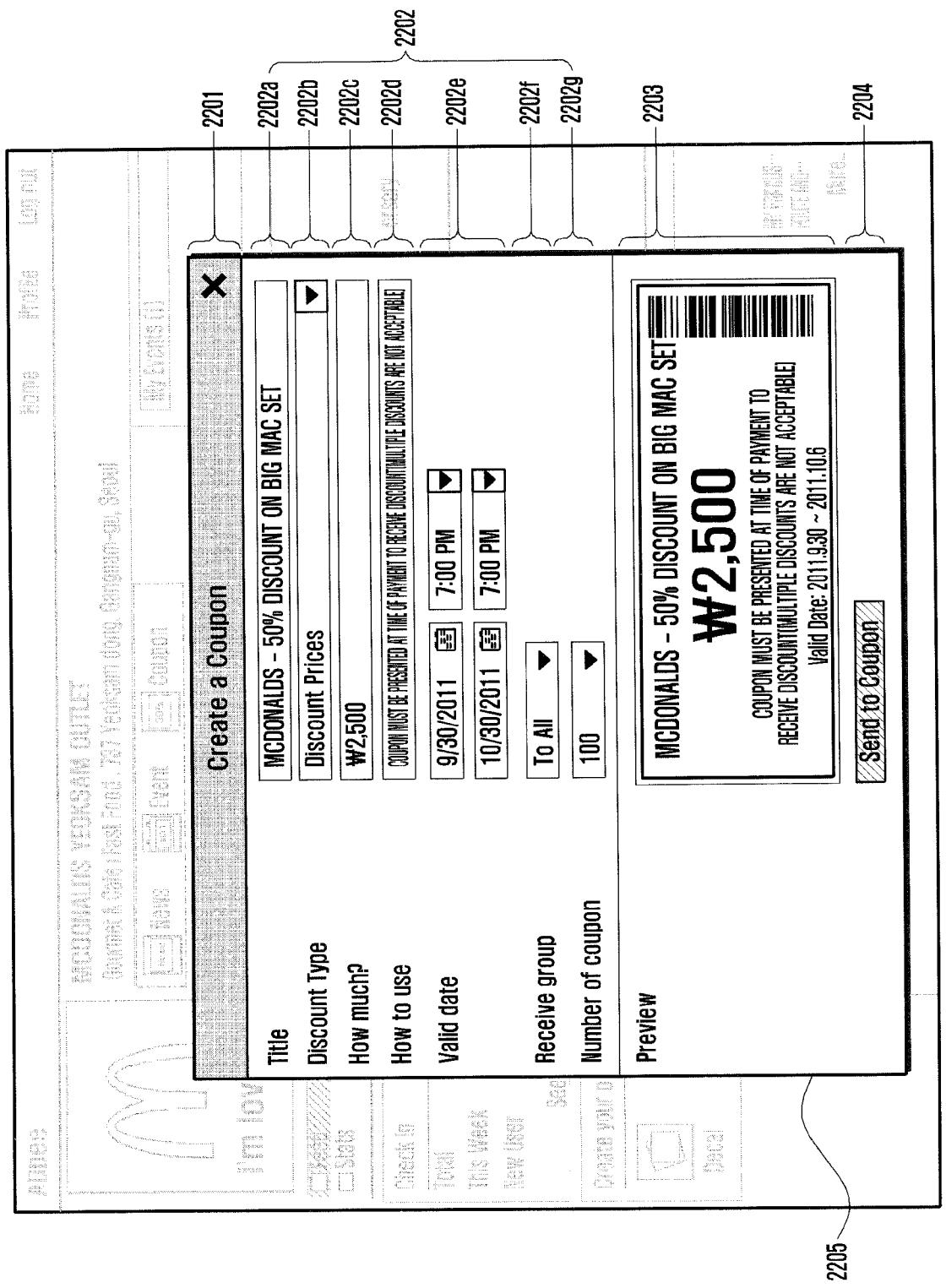

If the coupon creating menu 2110c is executed, the PC 700 displays a coupon creating screen 2205 as shown in FIG. 22. According to an exemplary embodiment of the present invention, the coupon creating screen 2205 is output as a pop-up window. However, it should be understood that the invention is not limited thereto. For example, the coupon creating screen 2205 may be output as the entire screen.

Referring to FIG. 22, the coupon creating screen 2205 is designed in a similar form as the invitation creating screen 2105. The coupon creating screen 2205 includes a title display area 2201 for displaying the title of window, a coupon information input area 2202, a preview area 2203 and a coupon sending menu area 2204. The coupon information input area 2202 includes a field 2202a for entering the title of a coupon, a field 2202b for selecting a type of coupon, a field 2202c for entering discount information, a field 2202d for entering a method to use a coupon, a field 2202e for setting validity date of a coupon, a class selecting field 2202f for selecting customers to whom a coupon is transmitted, and a field 2202g for setting the number of coupons to be issued.

As shown in FIG. 20, the history display area 2120 displays the mobile advertising messages that advertisers issued. The history display area 2120 includes an arrangement menu 2120a including arrangement conditions, e.g., all view, news view, invitation view, and coupon view; a mobile advertisement display area 2120b for displaying mobile advertising messages, in order of issuance, according to the arrangement condition selected via the arrangement menu 2120a; and a view more menu 2120c for displaying mobile advertisements that are not shown on the screen.

Figure 23:
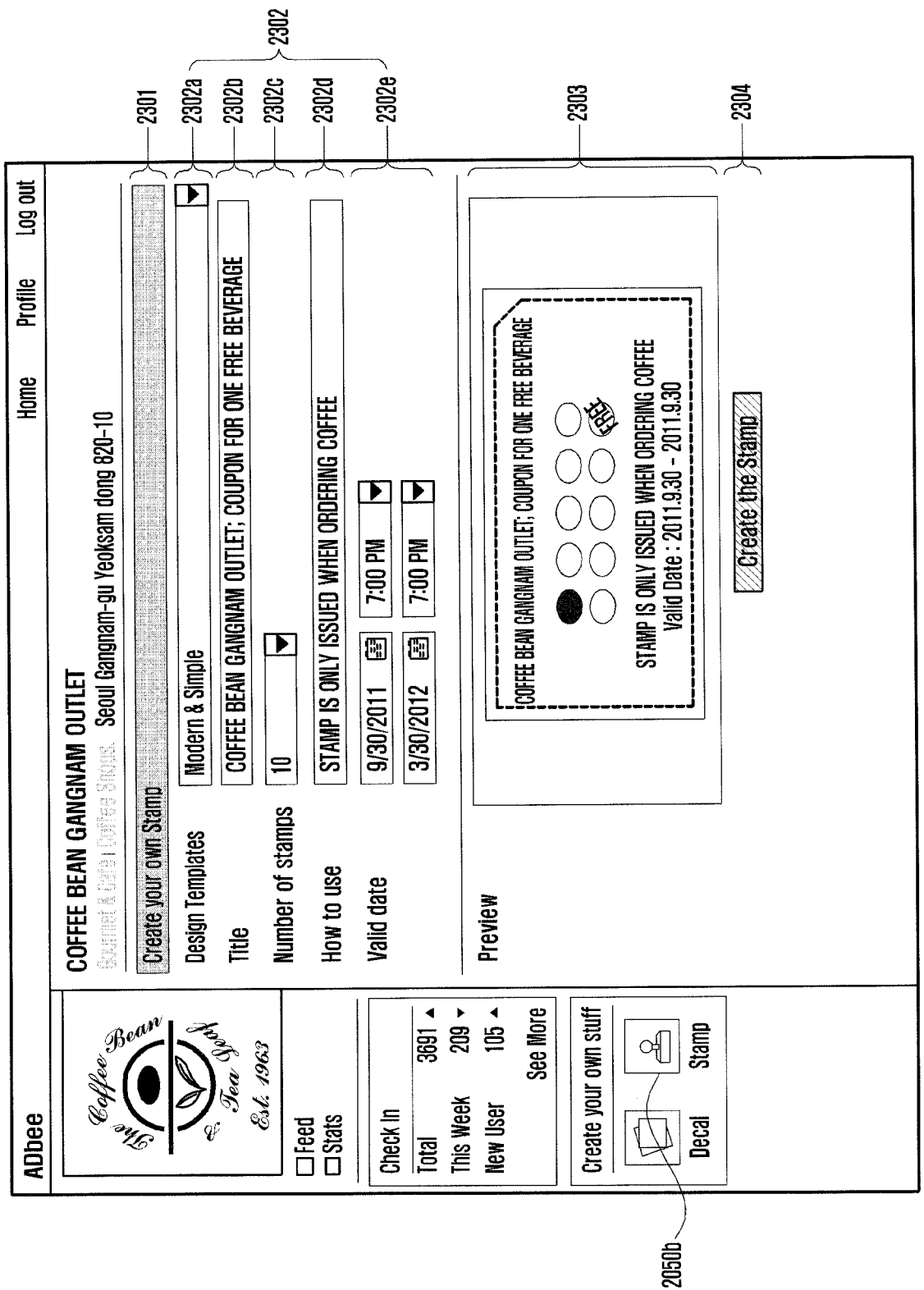

Referring to FIG. 23, if the stamp card creating menu 2050b is executed, the PC 700 outputs the stamp card creating screen. In an exemplary embodiment of the present invention as shown in FIG. 23, the stamp card creating screen may be displayed as a part of area on the web page. It should be understood that the invention is not limited to the exemplary embodiment of the present invention. For example, the stamp card creating screen may be displayed as a pop-up window.

As shown in FIG. 23, the stamp card creating screen includes a title display area 2301, a stamp card information input area 2302, a preview area 2303, and a stamp card creating menu area 2304. The stamp card information input area 2302 includes a template selection field 2302a for selecting one of the stamp card design templates, a field 2302b for entering the title of the stamp card, a field 2302c for setting the number of stamps, a field 2302d for entering usage of a stamp card, and a field 2302e for setting stamp card validity date. The preview area 2303 displays, in real time, a stamp card image that will be created, based on information that is set via the stamp card information input area 2302. The stamp card creating menu area 2304 includes a stamp card creating menu for executing the creation of a stamp card. The stamp card creating menu is disenabled until stamp card information is entered in the stamp card information input area 2302.

Figure 24:
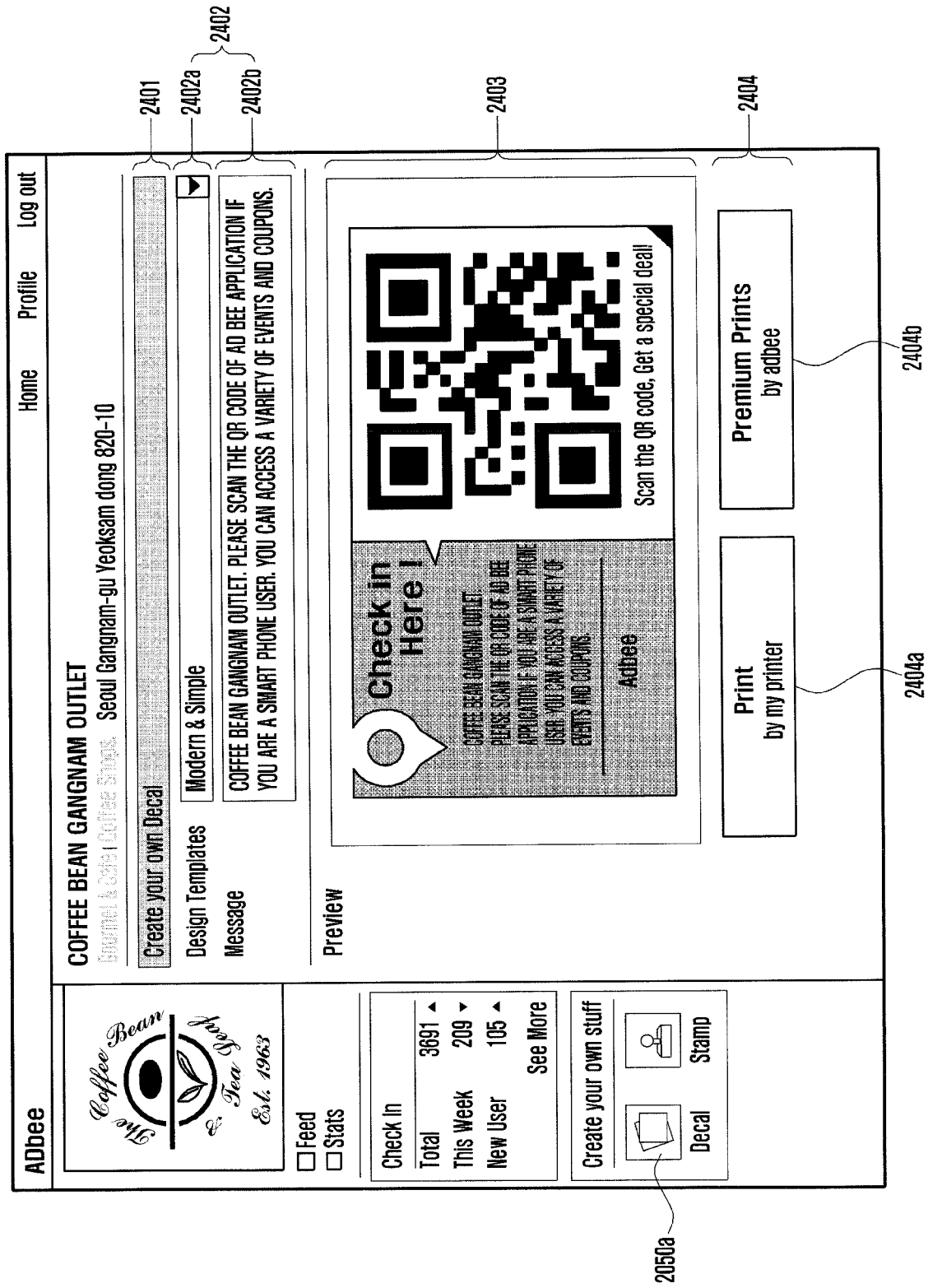
FIG. 24 illustrates a screen that describes a method for creating a QR code according to an exemplary embodiment of the present invention.

FIG. 24 illustrates a method for creating a QR code according to an exemplary embodiment of the present invention.

Referring to FIG. 24, if the QR code creating menu 2050a is executed, the PC 700 outputs the QR code creating screen. In an exemplary embodiment of the present invention as shown in FIG. 24, the QR code creating screen may be displayed as a part of area on the web page. It should be understood that the invention is not limited to the exemplary embodiment of the present invention. For example, the QR code creating screen may be displayed as a pop-up window.

As shown in FIG. 24, the QR code creating screen includes a title display area 2401, a QR information input area 2402, a preview area 2403, and a QR code creating menu area 2404. The QR code information input area 2402 includes a template selection field 2402a for selecting one of the QR code design templates and a message input field 2402b for entering an advertising copy. The preview area 2403 displays, in real time, a QR code image that will be created, based on information that is entered to the QR code information input area 2402. The QR code creating menu area 2404 includes a first print menu 2404a for printing a QR code via a printer (not shown) connected to the PC 700 and a second print menu 2404b for storing a QR code as an image file.

FIGS. 25 to 28 illustrate screens showing statistical information regarding use states of mobile advertising messages according to an exemplary embodiment of the present invention.

Figure 25:
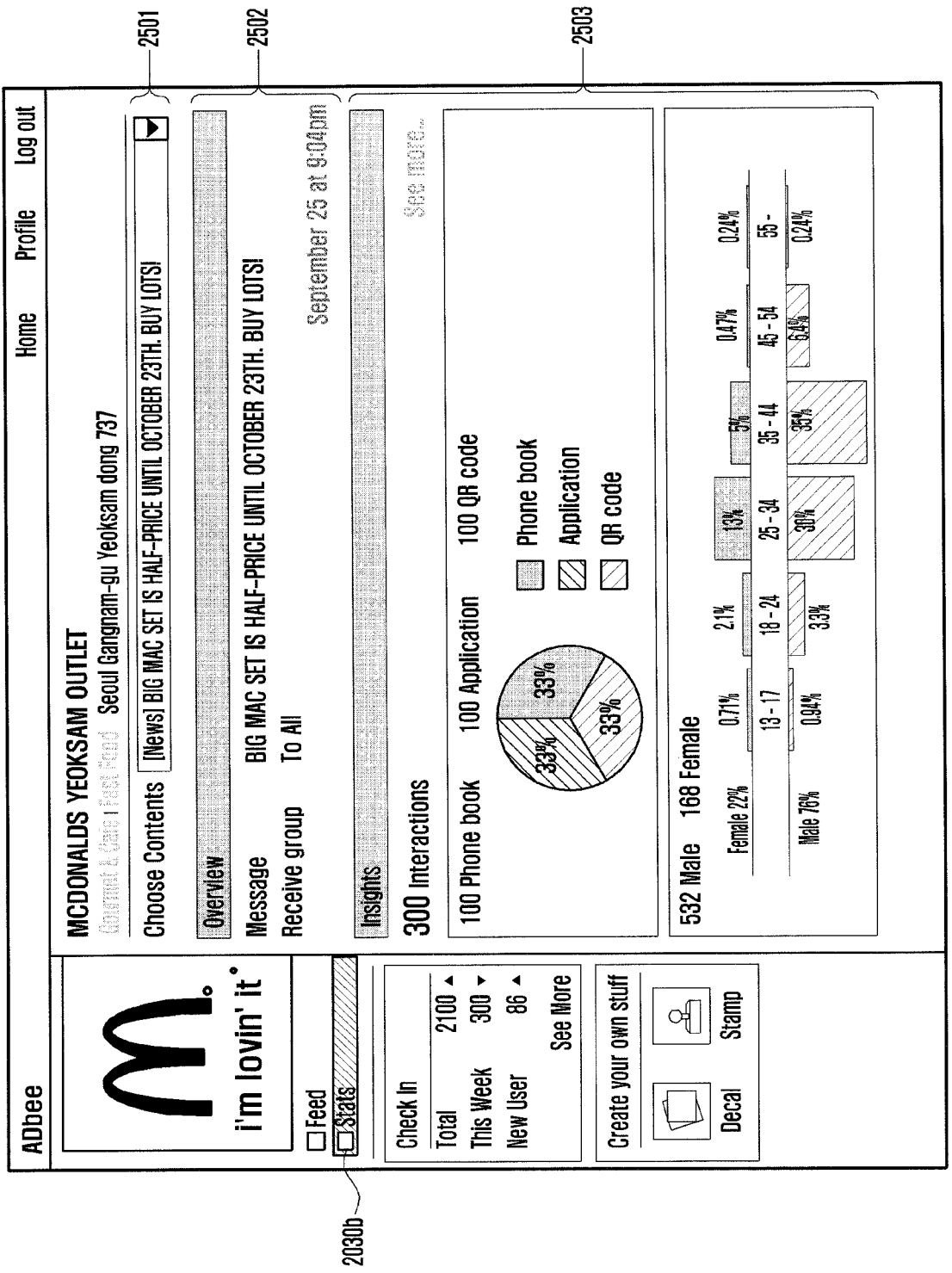
Figure 26:
Figure 28:
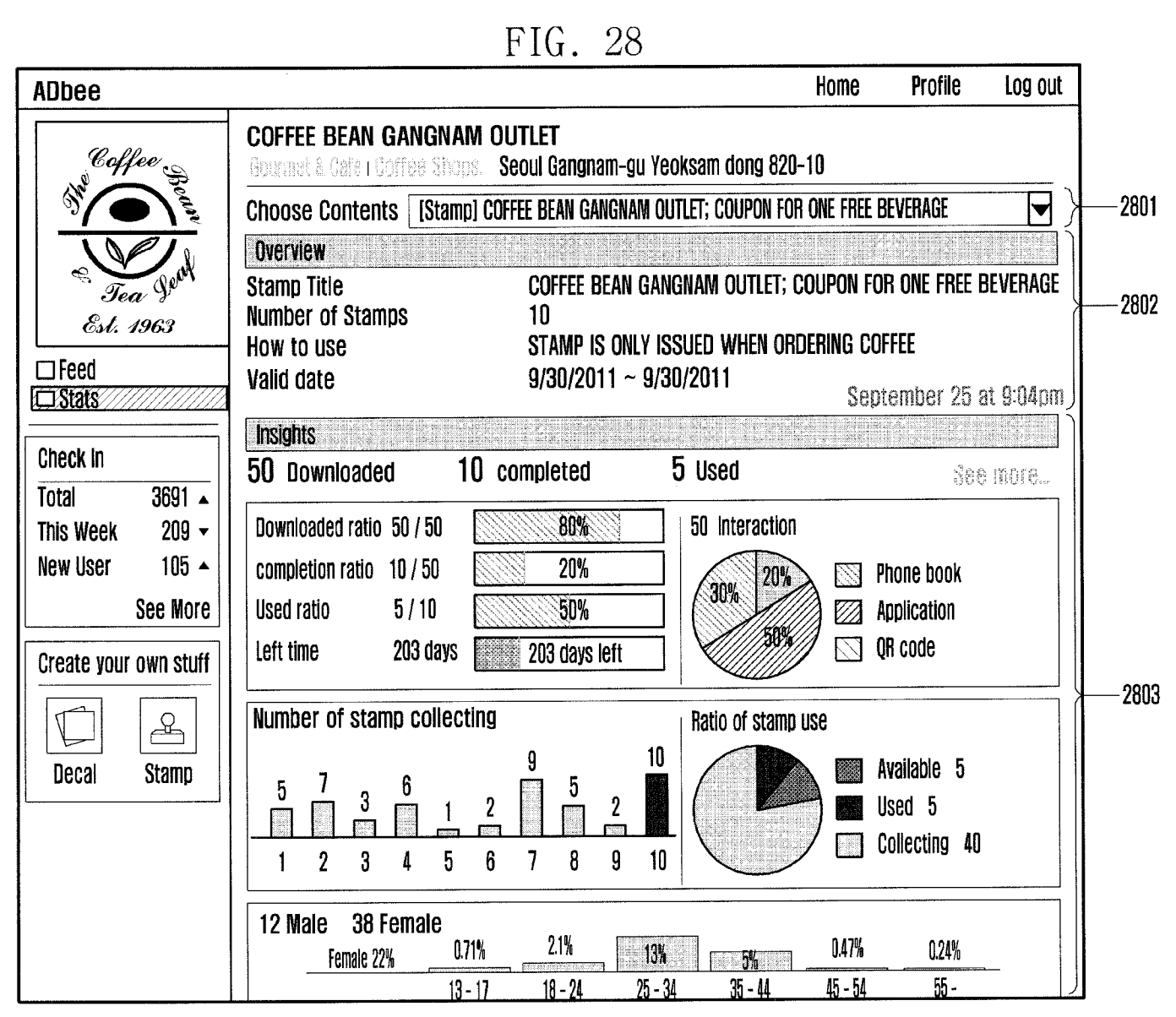

Referring to FIGS. 25 to 28, if the statistical information view menu 2030b is executed, the PC 700 outputs the statistical information screen. The statistical information screen displays plots of analysis results for the state of using issued mobile advertisements (e.g., news, invitations, coupons, stamp cards, etc.) for a certain period of time. FIG. 25 is a screen showing statistical information regarding the state of using news contents. FIG. 26 is a screen showing statistical information regarding the state of using invitations. FIG. 27 is a screen showing statistical information regarding the state of using coupons. FIG. 28 is a screen showing statistical information regarding the state of using stamp cards.

As shown in FIGS. 25 to 28, the statistical information screens include areas 2501, 2601, 2701, and 2801 for selecting mobile advertisements with respect to which the user needs to view statistical information; areas 2502, 2602, 2702, and 2802 for displaying overview information with respect to the selected mobile advertisement; and areas 2503, 2603, 2703, and 2803 for displaying analysis information, respectively.

Each of the mobile advertisement selecting areas 2501, 2601, 2701, and 2801 may be implemented with a drop-down menu and displays a list of mobile advertisements in order of registration.

The analysis information display areas 2503, 2603, 2703, and 2803 display, via plots, the analysis information for mobile advertisements selected via the mobile advertisement selecting areas 2501, 2601, 2701, and 2801. The analysis information may include the total number of customers who received mobile advertisements, a distribution chart according to the paths (e.g., phone book, mobile advertising application, QR code, etc.) receiving mobile advertisements, distribution charts according to the ages and sex of customers who received mobile advertisements, and the like. The analysis information with respect to an invitation includes a distribution chart of attendance/postponement/nonattendance to the invention. The analysis information with respect to a coupon includes a distribution chart of a rate of downloading the coupon, a rate of using the coupon, the remaining date of the validity date, and the like. The analysis information with respect to a stamp card includes a distribution chart of a rate of downloading the stamp card, a rate of collecting stamps to match a corresponding condition, a rate of using the stamp card, the remaining date of the validity date, and the like. The analysis information may be expressed via a variety of plots, such as a vertical or horizontal bar chart, a pie chart, a line chart, and the like.

FIG. 29 illustrates a screen showing details of check-in information according to an exemplary embodiment of the present invention.

Referring to FIG. 29, if a view more menu 2040a for viewing details of check-in information is executed, the PC 700 outputs a screen showing details regarding check-in information. The detail display screen shows an area 2901 for setting a period of time to collect statistical information with respect to check-in information; a check-in information display area 2902 for displaying the number of check-ins in the entire period of time, the number of check-ins for a selected period of time, and the number of check-ins by new customers; and an rank information providing area 2903 for displaying ranks according to the local areas, types of businesses, with respect to the number of check-ins. The check-in information display area 2902 displays check-in information via numbers or plots. FIG. 29 shows a line chart of the number of check-ins for a selected period of time according to dates. If the mouse cursor is located at a data point on the line or a touch is made thereat, a corresponding date and the number of check-ins are displayed via a pop-up window (not shown). If a particular date is selected (e.g., by a mouse cursor or a touch) on the horizontal axis of the line chart, a bar chart (not shown) showing the number of check-ins vs. hours is displayed via a pop-up window (not shown).

Figure 31:

FIGS. 30 and 31 illustrate screens for managing profile information regarding an advertiser according to an exemplary embodiment of the present invention.

Referring to FIGS. 30 and 31, if the profile information viewing menu 2010b is executed (via a mouse cursor or a touch), the PC 700 displays an advertiser's profile information on the screen. The profile information screen shows the company name, and company registration number, as shown in FIG. 30. The profile information screen also shows basic information, such as an email address, a phone number, a type of business, a detailed type of business, mail address, and the like, and additional information such as business hours, menus and price, interior photographs, and the like.

If an edit menu 3010 is executed on the profile information screen, the profile information screen is switched to a profile information edit screen to edit profile information as shown in FIG. 31. The profile information edit screen shows an area 3201 for displaying the company name and company registration number. The company name and company registration number cannot be edited on the profile information edit screen. The profile information edit screen may include an area 3102 for changing a profile image, an area 3103 for altering basic information and an area 3104 for altering additional information. The dim portion as shown in FIG. 31 represents a portion of screen that is not currently displayed on the screen but is displayed when it is scrolled up.

As described above, the mobile advertising service providing system and method according to the invention may create a database by automatically processing information regarding customers who have registered a contact of an advertiser in their phone books and manage the database, thereby allowing the advertiser to efficiently issue mobile advertising messages to the customers. This can maximize the effectiveness of advertising while reducing the advertising cost, compared with cost of conventional mobile advertising systems that transmit mobile advertising messages to an unspecified number of mobile device users.

The mobile advertising service providing system and method according to exemplary embodiments of the present invention allow a mobile device user to receive mobile advertising messages from advertisers registered in the phone book of the user's mobile device, thereby preventing the user from receiving spam messages and thus inconveniencing the user. In addition, when outputting the received mobile advertising messages, the mobile advertising service providing system may first display coupons, invitations, stamps, and the like, that have been downloaded, thereby allowing the user to easily use the mobile advertisements.

As described above, the mobile advertising service providing method according to exemplary embodiments of the present invention may be implemented with program commands that may be conducted via various types of computers and recorded in non-transitory computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. The computer-readable recoding media includes hardware systems for storing and conducting program commands. Examples of the hardware systems are magnetic media such as a hard disk, floppy disk, a magnetic tape, optical media such a Compact Disc-Read Only Memory (CD-ROM) and Digital Versatile Disc (DVD), Magneto-Optical Media, such as floptical disk, Read Only Memory (ROM), Random Access Memory (RAM), flash memory, and the like. The program commands include assembly language or machine code complied by a complier and a higher level language interpreted by an interpreter. The hardware systems may be implemented with at least one software module to comply with the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a mobile advertising service, the method comprising:
  detecting, by a processor of a mobile device, an execution of a mobile advertising application on the mobile device;
  determining, by location information circuitry of the mobile device, a current location of the mobile device;
  transmitting, to a mobile advertising server via communication circuitry of the mobile device, the current location of the mobile device,
  receiving, from the mobile advertising server via the communication circuitry, one or more mobile advertising messages according to the execution of the mobile advertising application, the mobile advertising messages being issued by advertisers located within a certain range of the current location of the mobile device, the certain range being set by a user of the mobile device;
  in response to a user touch input on a predetermined area of a display of the mobile device, displaying, on the display of the mobile device, the received mobile advertising messages on a display of the mobile device according to a preset rule; and
  performing a search on the received mobile advertising messages according to a search mode determined based on user input and displaying a result of the search,
  wherein each of the mobile advertising messages include at least one coupon, invitation, or stamp card,
  wherein the preset rule instructs the processor of the mobile device to arrange and display the received mobile advertising messages in order of:
    mobile advertising messages that have a history where the corresponding at least one coupon, invitation, or stamp card was downloaded, in order of distance between the current location and the locations of advertisers who issued the mobile advertising messages, followed by
    mobile advertising messages issued by advertisers who have been registered in a phone book, in order of distance between the current location and the locations of advertisers who issued the mobile advertising messages, and finally
    the remaining mobile advertising messages, in order of distance between the current location and the locations of advertisers who issued the mobile advertising messages, and
  wherein the mobile advertising server is configured to:
    receive contact information of an advertiser who signed up for the mobile advertising service,
    receive a phone book of a subscriber who signed up for the mobile advertising service from the mobile device,
    determine whether the contact information of the advertiser is included in the phonebook by retrieving the phone book of the subscriber, and
    when the contact information of the advertiser is included in the phonebook of the subscriber, store information related to the subscriber in a customer database of the advertiser.

2. The method of claim 1, wherein the displaying of the received mobile advertising messages comprises:
  displaying a search menu for requesting for a search of nearby companies, a menu for scanning at least one of a bar code and a Quick Response (QR) code, a collection menu for moving to a collection that stores coupons, stamp cards, and invitations that are downloaded, or a setting menu for setting user information.

3. The method of claim 1, wherein each item in a list of the mobile advertising message includes:
  an icon representing the corresponding at least one of the coupon, the stamp card, or the invitation, and
  information about the mobile advertising message.

4. The method of claim 1, further comprising:
  displaying, if one of the displayed mobile advertising messages is selected, a detail display screen displaying details of the selected mobile advertising message including a contact addition menu and a call free menu on the screen.

5. The method of claim 4, further comprising:
  displaying a check-in menu and a special offer coupon if the detail display screen is displayed by scanning a Quick Response (QR) code or by performing short-range wireless communication.

6. The method of claim 3, further comprising:
arranging and displaying, if a collection menu is selected, mobile advertising messages in a list stored in a collection, in order of validity date.

7. The method of claim 6, wherein the list of mobile advertising messages stored in the collection comprises:
an accordion menu for expanding or contracting at least one of the coupon, the invitation, or the stamp card included in the mobile advertising message.

8. A mobile device comprising:
a memory;
location information circuitry;
a communication circuitry;
a display; and
a processor configured to:
  execute a mobile advertising application,
  determine a current location of the mobile device via the location information circuitry,
  transmit, to a mobile advertising server via the communication circuitry, the current location of the mobile device,
  receive, from the mobile advertising server, one or more mobile advertising messages according to the execution of the mobile advertising application, the mobile advertising messages being issued by advertisers located within a certain range of the current location of the mobile device, the certain range being set by a user of the mobile device,
  in response to a user touch input on a predetermined area of the display, display the received mobile advertising messages on the display according to a preset rule, and
  perform a search on the received mobile advertising messages according to a search mode determined based on user input and display a result of the search,
wherein to arrange and display the received mobile messages, the processor is configured to arrange and display the mobile advertising messages in order of:
  mobile advertising messages that have a history where the corresponding at least one coupon, invitation, or stamp card was downloaded, in order of distance between the current location and the locations of advertisers who issued the mobile advertising messages, followed by
  mobile advertising messages issued by advertisers who have been registered in a phone book, in order of distance between the current location and the locations of advertisers who issued the mobile advertising messages, and finally
  the remaining mobile advertising messages, in order of distance between the current location and the locations of advertisers who issued the mobile advertising messages, and
wherein the mobile advertising server is configured to:
  receive contact information of an advertiser who signed up for the mobile advertising service,
  receive a phone book of a subscriber who signed up for the mobile advertising service from the mobile device,
  determine whether the contact information of the advertiser is included in the phonebook by retrieving the phone book of the subscriber, and
  when the contact information of the advertiser is included in the phonebook of the subscriber, store information related to the subscriber in a customer database of the advertiser.

* * * * *